(12) United States Patent
Morimoto et al.

(10) Patent No.: US 10,018,496 B2
(45) Date of Patent: Jul. 10, 2018

(54) HOPPER AND COMBINATION SCALE COMPRISING THE SAME

(71) Applicant: YAMATO SCALE CO., LTD., Akashi-shi, Hyogo (JP)

(72) Inventors: Koji Morimoto, Akashi (JP); Ryo Shimizu, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 195 days.

(21) Appl. No.: 15/202,203

(22) Filed: Jul. 5, 2016

(65) Prior Publication Data
US 2017/0023399 A1 Jan. 26, 2017

(30) Foreign Application Priority Data

Jul. 2, 2015 (JP) .................................. 2015-133761

(51) Int. Cl.
| | | |
|---|---|---|
| B65D 90/62 | (2006.01) | |
| F16C 11/04 | (2006.01) | |
| G01G 13/18 | (2006.01) | |
| G01G 19/393 | (2006.01) | |
| B65G 11/02 | (2006.01) | |
| B65G 11/20 | (2006.01) | |
| G01G 13/02 | (2006.01) | |
| B65D 90/58 | (2006.01) | |

(52) U.S. Cl.
CPC ......... *G01G 19/393* (2013.01); *B65G 11/023* (2013.01); *B65G 11/203* (2013.01); *G01G 13/024* (2013.01); *G01G 13/18* (2013.01); *B65D 90/582* (2013.01); *B65D 90/623* (2013.01)

(58) Field of Classification Search
CPC ...... G01G 13/024; G01G 13/16; G01G 13/18; G01G 19/393; G01G 19/387; B65G 11/023; B65G 11/203; B65D 90/582; B65D 90/62; B65D 90/623; F16C 11/04
See application file for complete search history.

(56) References Cited

U.S. PATENT DOCUMENTS 5,379,923 A * 1/1995 Sagastegui ............. G01G 13/18
177/108
7,053,317 B2 * 5/2006 Asai ....................... G01G 13/16
177/103

FOREIGN PATENT DOCUMENTS

JP          2003-155096 A          5/2003

OTHER PUBLICATIONS

Computer translation of JP 2003-155096 from the JPO website. Feb. 26, 2018.*

* cited by examiner

*Primary Examiner* — Randy Gibson
(74) *Attorney, Agent, or Firm* — Norris McLaughlin & Marcus

(57) ABSTRACT

A hopper has a gate pivotable to open and close the lower opening of a hopper body, wherein opposing side parts more spaced apart than a width of the body are extending from the gate, and the opposing side parts of the gate are externally fitted pivotably to fulcrum shafts protruding from outer side surfaces of the hopper body. The hopper further includes regulating members interposed between the outer side surfaces of the body and the opposing side parts of the gate. The regulating members are configured to regulate movements of the gate in pivotal directions thereof and are detachably engaged with the fulcrum shafts circumferentially around the fulcrum shafts.

13 Claims, 21 Drawing Sheets

HOPPER AND COMBINATION SCALE COMPRISING THE SAME

BACKGROUND OF THE INVENTION

This invention relates to hoppers configured to store therein articles to be weighed including foodstuffs and discharge the articles, and a combination scale equipped with the hoppers.

Conventionally, combination scales are structurally characterized as described below. The combination scale receives articles to be weighed, and a dispersing feeder radially disperses and delivers the received articles. The dispersed articles are delivered linearly outward by a plurality of linear feeders disposed around the dispersing feeder. The articles delivered by the linear feeders are thrown into a plurality of feeding hoppers facing delivering ends of the linear feeders. The feeding hoppers temporarily store therein the articles and then open their gates to feed the articles into a plurality of weighing hoppers disposed therebelow. The combination scale executes combinatorial computations to select a combination of weighing hoppers containing the variously combined articles of a total weight that falls within a predetermined range of weights. Then, the combination scale opens the gates of the weighing hoppers selected by the combinatorial computations to discharge the articles into, for example, collecting chutes, and then, finally into a packaging machine installed down below.

JP 2003-155096 describes a known example of the hoppers including the feeding hoppers used in such a combination scale. The patent literature 1 further describes that fulcrum bolts for pivotably supporting both sides of a gate are screwed, through bearing bushes, into internally threaded bosses fixed to outer side surfaces of a hopper body.

SUMMARY OF THE INVENTION

The combination scales for use in weighing foodstuffs need to be cleaned at regular intervals in the perspective of food sanitation. The combination scales also need to be cleaned whenever the type of food to be weighed is changed. To facilitate the cleaning, the combination scales may be structured to have any transport members and hoppers possibly in contact with articles be readily removed from their bodies.

In the hoppers, both side parts of their gates may be pivotably journaled to outer side surfaces on both sides of bodies of the hoppers, so that the gates are openable and closable as the side parts thereof are pivoted. Such a structure allows the hoppers to hold and discharge the articles to be weighed. For thorough cleaning of the hoppers removed from the body of a combination scale, it is desirable to disassemble the hoppers and remove their gates from the bodies.

In the above-described hopper of the prior art, the gate is securely fitted to its hopper body with the fulcrum bolts. Whenever the gate is removed from and refitted to the hopper, therefore, it is necessary to pivot the fulcrum shafts using such a tool as a spanner, which is a laborsome task. Taking a hopper with a pair of gates for instance, the two gates are supported by both side surfaces of its hopper body with fulcrum bolts, which means that four fulcrum bolts in total need to be fastened and loosened for handling one hopper alone.

The combination scale has a large number of hoppers including the feeding hoppers and the weighing hoppers. It takes tremendous time and labor to disassemble and thoroughly clean such a large number of hoppers and reassemble all of the hoppers to the combination scale when the cleaning is over.

To address these issues, the invention is directed to providing a hopper that may be easily and readily disassembled and reassembled, and a combination scale equipped with such hoppers easy to handle.

To this end, the invention provides for the following technical features.

1) A hopper according to the invention includes:
a body having openings on upper and lower sides thereof; and
a gate pivotable to open and close the lower opening of the body, wherein
the body of the hopper includes fulcrum shafts protruding from outer side surfaces on both sides thereof,
the gate includes opposing side parts spaced apart at an interval greater in dimension than a width of the body between the outer side surfaces, the opposing side parts of the gate being externally fitted pivotably to the fulcrum shafts on the outer side surfaces of the body,
the hopper further includes regulating members interposed between the outer side surfaces of the body and the opposing side parts of the gate, the regulating members being configured to regulate movements of the gate in axial directions of the fulcrum shafts to prevent the opposing side parts from falling off the fulcrum shafts, and
the regulating members are detachably engaged with the fulcrum shafts circumferentially around the fulcrum shafts.

In the hopper according to this invention, the regulating members are detachably engaged with the fulcrum shafts circumferentially around the fulcrum shafts. The regulating members thus engaged with the fulcrum shafts may be easily disengaged from the fulcrum shafts. Disengaging the regulating members from the fulcrum shafts leaves large clearances corresponding to the thicknesses of the regulating members between the outer side surfaces of the hopper body and the opposing side parts of the gate more spaced apart than the outer side surfaces of the hopper body. Such large clearances may allow for large movements of the gate in its axial directions of the fulcrum shafts in directions along the fulcrum shafts. This may facilitate the removal of the opposing side parts of the gate from the fulcrum shafts, allowing the hopper to be easily disassembled.

To reassemble the components of the hopper, the opposing side parts of the gate more spaced apart than the outer side surfaces of the hopper body are externally fitted to the fulcrum shafts on the outer side surfaces of the hopper body. Then, the regulating members are engaged circumferentially with the fulcrum shafts to fill the clearances between the outer side surfaces of the hopper body and the opposing side parts of the gate. This may successfully prevent the opposing side parts from falling off the fulcrum shafts.

Unlike the conventional example wherein the gate is fixed to the hopper body with fulcrum bolts, it is no longer necessary to disassemble or reassemble the hopper by pivoting the fulcrum bolts using such a tool as a spanner. As a result, the hopper may be easily and speedily disassembled and reassembled.

2) In preferred aspects of the hopper according to this invention, the opposing side parts of the gate include fulcrum portions externally fitted to the fulcrum shafts of the body of the hopper, and the fulcrum portions include fulcrum bosses and flanged bearings removably inserted in the fulcrum bosses from inner sides of the opposing side parts.

In these aspects of the invention when the regulating members are disengaged from the fulcrum shafts for removal of the opposing side parts of the gate, the flanged bearings inserted in the fulcrum bosses of the opposing side parts may be removable from the fulcrum bosses. Removing these bearings leaves clearances between the fulcrum bosses of the opposing side parts and the fulcrum shafts, affording inclination of the fulcrum bosses relative to the fulcrum shafts to an extent allowed by the clearances. After one of the opposing side parts is removed from one of the fulcrum shafts by way of large movement of the gate in one of the directions along the fulcrum shafts, the gate having the other one of the opposing side parts being fitted in the other one of the fulcrum shafts may be inclined relative to the other one of the fulcrum shafts. Then, the other one of the opposing side parts of the gate may be easily removed from the other one of the fulcrum shafts by way of large movement of the inclined gate in the other one of the directions along the fulcrum shafts.

To reassemble the components of the hopper, the opposing side parts of the gate may be easily externally fitted to the fulcrum shafts by inclining the gate relative to the fulcrum shafts of the hopper body.

3) In other aspects of the hopper according to the invention, the body of the hopper includes mounting shafts protruding from the outer side surfaces of the body, the regulating members are pivotably and removably fitted to the mounting shafts, and the regulating members are pivoted around the mounting shafts to be detachably engaged with the fulcrum shafts circumferentially around the fulcrum shafts.

In these aspects of the invention, the mounting shafts have their positions relative to the fulcrum shafts be already determined when they are located in the hopper. This may settle positions of the regulating members fitted to the mounting shafts relative to the fulcrum shafts. In case the regulating members fitted to the mounting shafts are carelessly pivoted, the regulating members may still be engaged well with the fulcrum shafts circumferentially around them. Thus, incorporating the regulating members in the hopper may be easily handled.

4) In other aspects of the hopper according to this invention, the hopper further includes stoppers configured to abut the regulating members to deter displacements of the regulating members engaged with the fulcrum shafts in directions in which the engagements with the fulcrum shafts are released.

In these aspects of the invention, by further providing the stoppers that deter displacements of the regulating members in the directions in which the engagements with the fulcrum shafts are released, the regulating members engaged with the fulcrum shafts may be prevented from accidentally falling off the fulcrum shafts under any physical impacts at the time of mounting the hopper to the body of a combination scale and/or due to vibrations generated at the time of opening and closing the gate of the hopper in operation.

5) In preferred aspects of the hopper according to this invention, the body of the hopper includes support pins protruding from the outer side surfaces of the body, the stoppers are externally fitted removably to the support pins, and the hopper further includes retaining pieces configured to prevent the stoppers from falling off the support pins.

In these aspects of the invention, by further providing the retaining pieces that prevent the stoppers from falling off the support pins, it may be avoidable that the stoppers per se are displaced or fall off, ensuring that the regulating members are kept at predetermined positions. At the time of disassembling the hopper, the stoppers may be easily pulled out from the support pins by removing the retaining pieces, so that the regulating members are ready to be detachable.

6) In other aspects of the hopper according to this invention, the hopper includes the gates provided in a pair, wherein the gates are pivoted in opposite directions to open and close the lower opening of the body of the hopper, the regulating members are separately interposed between the outer side surfaces of the body and the opposing side parts of the gates, and the stopper singly provided deters displacements of the regulating members on the outer side surfaces in the directions in which the engagements with the fulcrum shafts are released.

A large number of hoppers including paired gates may be accompanied by a correspondingly large number of regulating members. In these aspects of the invention, however, the stoppers are reduced to one-half. In contrast to any hopper having one stopper for each of the regulating members, time and labor for assembling and disassembling the components of the hopper may be accordingly reduced.

7) A combination scale according to this invention includes:

a dispersing feeder configured to radially disperse and deliver articles to be weighed received from outside;

a plurality of linear feeders configured to deliver outwardly the articles dispersed in and delivered from the dispersing feeder; and a plurality of feeding hoppers configured to hold and discharge the articles delivered from the linear feeders; and a plurality of weighing hoppers configured to hold and weigh the articles discharged from the feeding hoppers, wherein the feeding hoppers and the weighing hoppers each include a body having openings on upper and lower sides thereof, and a gate pivotable to open and close the lower opening of the body, the bodies of the feeding hoppers and the weighing hoppers each have fulcrum shafts protruding from outer side surfaces on both sides of the body, the gates each include opposing side parts spaced apart at an interval greater in dimension than a width of the body between the outer side surfaces, the opposing side parts in each of the gates being externally fitted pivotably to the fulcrum shafts on the outer side surfaces of the body, the feeding hoppers and the weighing hoppers each further include regulating members interposed between the outer side surfaces of the body and the opposing side parts of the gate, the regulating members being configured to regulate movement of the gate in axial directions of the fulcrum shafts to prevent the opposing side parts from falling off the fulcrum shafts, and the regulating members are detachably engaged with the fulcrum shafts circumferentially around the fulcrum shafts.

In the feeding hoppers and the weighing hoppers of the combination scale according to this invention, disengaging the regulating members from the fulcrum shafts leaves large clearances between the outer side surfaces of the hopper body and the opposing side parts of the gate. Such large clearances may allow for large movements of the gate in its pivotal directions, i.e., in directions along the fulcrum shafts. This may facilitate the removal of the opposing side parts of the gate from the fulcrum shafts, allowing the hopper to be easily disassembled.

To reassemble the components of the hopper, the opposing side parts of the gate more spaced apart than the outer side surfaces of the hopper body are externally fitted to the fulcrum shafts on the outer side surfaces of the hopper body.

Then, the regulating members are engaged circumferentially with the fulcrum shafts to fill the clearances between the outer side surfaces of the hopper body and the opposing side parts of the gate.

The combination scale according to this invention may have a significantly large number of hoppers, including the feeding hoppers and the weighing hoppers. In this combination scale, however, it is no longer necessary to disassemble or reassemble the hoppers by pivoting the fulcrum bolts using such a tool as a spanner, unlike the conventional example wherein the gate is fixed to the hopper body with fulcrum bolts. As a result, disassembling and reassembling the hoppers may be facilitated and expedited, and cleaning a large number of hoppers may be completed within a short period of time without extra time and labor.

8) In preferred embodiments of the combination scale according to this invention, the opposing side parts in each of the gates include fulcrum portions externally fitted to the fulcrum shafts of the body of the hopper, and the fulcrum portions include fulcrum bosses and flanged bearings removably inserted in the fulcrum bosses from inner sides of the opposing side parts.

In these aspects of the invention, removing the flanged bearings inserted in the fulcrum bosses of the opposing side parts from these fulcrum bosses leaves clearances between the fulcrum bosses of the opposing side parts and the fulcrum shafts of the hopper body, affording inclination of the fulcrum bosses relative to the fulcrum shafts to an extent allowed by the clearances Such clearances may allow for large movements of the gate, facilitating the removal of the opposing side parts of the gate from the fulcrum shafts. At the time of reassembling these components, the opposing side parts of the gates may be easily externally fitted to the fulcrum shafts by inclining the gate relative to the fulcrum shafts of the hopper body.

9) In other aspects of the combination scale according to the invention, the bodies of the hoppers each include mounting shafts protruding from the outer side surfaces of the body, the regulating members are pivotably and removably fitted to the mounting shafts, and the regulating members are pivoted around the mounting shafts to be detachably engaged with the fulcrum shafts circumferentially around the fulcrum shafts.

In these aspects of the invention, the mounting shafts have their positions relative to the fulcrum shafts be already determined, when they are located in the hopper. This may settle positions of the regulating members fitted to the mounting shafts relative to the fulcrum shafts. In case the regulating members fitted to the mounting shafts are carelessly pivoted, the regulating members may still be engaged well with the fulcrum shafts circumferentially around them. Thus, incorporating the regulating members in the hopper may be easily handled.

10) In other aspects of the combination scale according to this invention, the feeding hoppers and the weighing hoppers each further include stoppers configured to abut the regulating members to deter displacements of the regulating members engaged with the fulcrum shafts in directions in which the engagements with the fulcrum shafts are released.

In these aspects of the invention, by further providing the stoppers that deter displacements of the regulating members in the directions in which the engagements with the fulcrum shafts are released, the regulating members engaged with the fulcrum shafts may be prevented from accidentally falling off the fulcrum shafts under any physical impacts at the time of mounting the hopper to the body of a combination scale and/or due to vibrations generated at the time of opening and closing the gate of the hopper in operation.

11) In preferred aspects of the combination scale according to this invention, the bodies of the hoppers each include support pins protruding from the outer side surfaces thereof, the stoppers are externally fitted removably to the support pins, and the feeding hoppers and the weighing hoppers each further include retaining pieces configured to prevent the stoppers from failing off the support pins.

In these aspects of the invention, by further providing the retaining pieces that prevent the stoppers from falling off the support pins, it may be avoidable that the stoppers per se are displaced or fall off, ensuring that the regulating members are kept at predetermined positions. At the time of disassembling the hopper, the stoppers may be easily pulled out from the support pins by removing the retaining pieces, so that the regulating members are ready to be detachable.

12) In other aspects of the combination scale according to this invention, the feeding hoppers and the weighing hoppers each include the gates provided in a pair, wherein the gates are pivoted in opposite directions to open and close the lower opening of the body of the hopper, the regulating members are separately interposed between the outer side surfaces of the body and the opposing side parts of the gates, and the stopper singly provided deters displacements of the regulating members on the outer side surfaces in the directions in which the engagements with the fulcrum shafts are released.

A large number of hoppers including paired gates may be accompanied by a correspondingly large number of regulating members. In these aspects of the invention, however, the stoppers are reduced to one-half. In contrast to any hopper having one stopper for each of the regulating members, time and labor for assembling and disassembling the components of the hopper may be accordingly reduced.

13) In other preferred of the combination scale according to this invention, the combination scale further includes a plurality of memory hoppers configured to hold and discharge the articles received from the weighing hoppers, wherein the memory hoppers each include a body having openings on upper and lower sides thereof, and a gate pivotable to open and close the lower opening of the body, the bodies of the memory hoppers each have fulcrum shafts protruding from outer side surfaces on both sides of the body, the gates of the memory hoppers each have opposing side parts spaced apart at an interval greater in dimension than a width of the body between the outer side surfaces, the opposing side parts in each of the gates of the memory hoppers being externally fitted pivotably to the fulcrum shafts on the outer side surfaces of the body, the memory hoppers each further include regulating members interposed between the outer side surfaces of the body and the opposing side parts of the gate, the regulating members of the memory hoppers being configured to regulate movement of the gates in axial directions of the fulcrum shafts to prevent the opposing side parts from falling off the fulcrum shafts, and the regulating members of the memory hoppers are detachably engaged with the fulcrum shafts circumferentially around the fulcrum shafts.

In these aspects of the invention the combination scale further including the memory hopper has an even larger number of hoppers. By facilitating the disassembling and reassembling steps of the hoppers, however, cleaning such a large number of hoppers may be completed within a short period of time without extra time and labor.

As for a hopper, this invention may facilitate the removal of a gate from its body, thereby enabling speedy and thorough cleaning of the gate. Then, the cleaned gate may be easily and readily fitted to the hopper body.

As for a combination scale equipped with a large number of hoppers, this invention may reduce downtime of the combination scale associated with disassembling, cleaning, and reassembling such multiple hoppers, thereby improving the efficiency of the weighing operation.

BRIEF DESCRIPTION OF THE DRAWINGS

FIGS. 32 illustrate another embodiment of a stopper-fixing structure, wherein

FIGS. 33 illustrate another embodiment of the regulating member wherein

FIGS. 35 illustrates yet another embodiment of the regulating member wherein

DETAILED DESCRIPTION OF THE INVENTION

Hereinafter, embodiments of this invention are descried in detail referring to the accompanying drawings.

Figure 1:
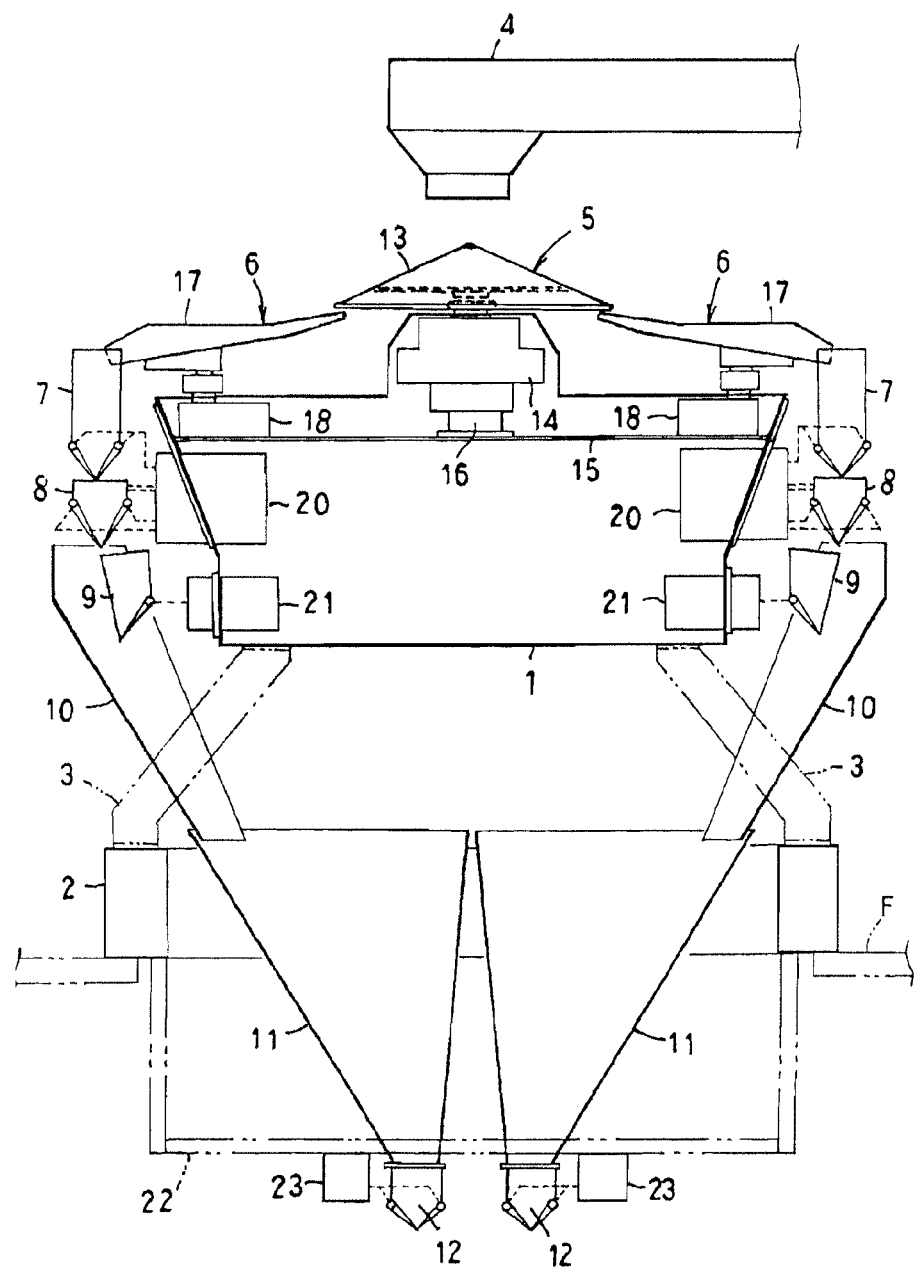
FIG. 1 is a longitudinal front view, schematically illustrating the structure of a combination scale according to an embodiment of the invention.
Figure 2:
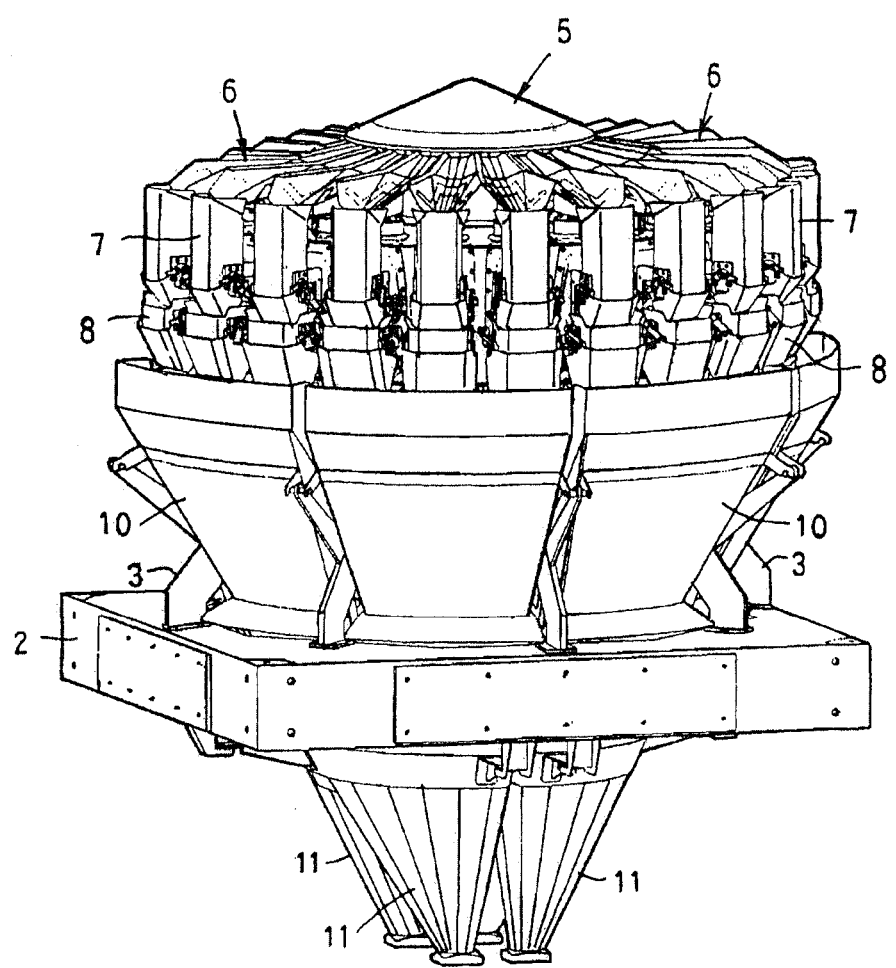
FIG. 2 is a perspective view of the combination scale illustrated in FIG. 1.

FIG. 1 is a longitudinal front view, schematically illustrating the structure of a combination scale according to an embodiment of the invention. FIG. 2 is a perspective view of the combination scale illustrated in FIG. 1.

The combination scale according to this embodiment is for use in, for example, a packaging line on which a predetermined quantity of articles to be weighed, typically, food including candies and snacks, are weighed and thrown into a packaging machine, not illustrated in the drawings, to be packed in bags.

The combination scale has, at its center, a center base 1 having a hollow columnar shape. The center base 1 is supported by a rectangular base 2 with a plurality of support legs 3 interposed therebetween. The base 2 has, at its center part, a large opening vertically penetrating therethrough. The base 2 is securely situated on a floor surface F.

A dispersing feeder 5 is mounted to an upper part of the center base 1. The dispersing feeder 5 radially disperses, by way of vibrations, the articles dropping downward through an end port of a feeder 4. A plurality of linear feeders 6 is radially disposed around the dispersing feeder 5. The linear feeders 6 respectively receive the articles dispersed and, thrown therein and linearly deliver the received articles outwardly by way of vibrations. The combination scale further has other hoppers disposed in the outer periphery of the center base 1; feeding hoppers 7, weighing hoppers 8, and memory hoppers 9. The feeding hoppers 7 temporarily store therein and discharge the articles received from the linear feeders 6. The weighing hoppers 8 temporarily store therein and weigh the articles discharged from the feeding hoppers 7. The memory hoppers 9 receive the articles weighed in the weighing articles 8 and store therein the received articles. The weighing, combinatorial computations, and discharge of the articles are carried out by multiple weighing modules (24 modules in this example) each consisting of a set of one linear feeder 6, feeding hopper 7, weighing hopper 8, and memory hopper 9.

In the illustrated, example, of the multiple weighing modules (24 modules), one-quarter modules (six modules); four weighing systems in total, independently carry out the weighing, combinatorial computations, and discharge of the articles.

The combinatorial computations variously combine the weights of articles in the weighing hoppers 8 and the memory hoppers 9 to thereby select a combination of the hoppers 8 and 9 containing the articles having a total weight that fall within a predetermined range of weights There are collecting chutes 10 below the weighing hoppers 8 and the memory hoppers 9, and collecting funnels 11 further below the collecting chutes 10. The collecting chutes 10 collect the articles discharged from plural ones of the weighing hoppers 8 or the memory hoppers 9 selected by the combinatorial computations. The collecting funnels 11 collect the articles dropping downward from the collecting chutes 10. Below the collecting funnels 11 are disposed collecting hoppers 12, as illustrated in FIG. 1. The collecting hoppers 12 receive and temporarily store therein the articles collected in the collecting funnels 11. The gates of the collecting hoppers 12 are opened in response to a discharge request command outputted from the packaging machine not illustrated in the drawing.

As illustrated in FIG. 1, the dispersing feeder 5 includes a conically shaped dispersing tray 13 and an electromagnetic vibration generator 14 that vibrates the dispersing tray 13. The vibration generator 14 is located at the center on a support frame 15 arranged inside the center base 1. The vibration generator 14 is coupled to and supported by a weight sensor 16 set on the support frame 15. The weight sensor 16 detects the weight of articles on the dispersing feeder 5. The detected information is inputted to a controller not illustrated in the drawings. The controller, based on the detected information, turns on or off the feeder 4, thereby constantly feeding the dispersing feeder 5 with the articles of a weight that falls within a predetermined range of weights.

The linear feeders 6 each include a delivery trough (feeder pan) 17 having a groove extending in an inward-outward direction, and an electromagnetic vibration generator 18 that vibrates the delivery trough 17. The vibration generators 18 of the linear feeders 6 are attached to the support frame 15 so as to surround the vibration generator 14 of the dispersing feeder 5. The delivery trough 17 is mountable to and dismountable from the vibration head unit of the vibration generator 18 by operating the lever of a buckle-type coupling mechanism on the back-surface side of the delivery trough 17 which is not illustrated in the drawing.

In the outer periphery of the center base 1 are disposed drive units 20. The drive units 20 have the following devices incorporated therein; motors (not illustrated in the drawing) that drive the gates of the feeding hoppers 7 and the weighing hoppers 8 to open and close, and weight sensors (not illustrated in the drawing) that weigh the articles in the weighing hoppers 8. The feeding hoppers 7 and the weighing hoppers 8 are removably mounted with hooks to and thereby supported by outwardly exposed parts of the drive units 20. On the lower side of the drive units 20 are disposed drive units 21 having motors incorporated therein. These motors (not illustrated in the drawing) drive the gates of the memory hoppers 9 to open and close. The memory hoppers 9 are removably mounted with hooks to and thereby supported by outwardly exposed parts of the drive units 21.

Four drive units 23 having motors (not illustrated in the drawing) incorporated therein are attached to a support frame 22 extending downward from the base 2. The motors of the drive units 23 drive gates of the collecting hoppers 12 to open and close. The collecting hoppers 12 are removably mounted with hooks to and thereby supported by the drive units 23.

By coupling the feeding hopper 7 and the weighing hopper 8 to the drive unit 20, gate opening-closing linkage mechanisms of the feeding hopper 7 and the weighing hopper 8 are immediately engageably coupled to motor-driven driver arms of the drive unit 20. By coupling the memory hopper 9 to the drive unit 21, a gate opening-closing linkage mechanism of the memory hopper 9 is immediately engageably coupled to a motor-driven driver arm of the drive unit 21. By coupling the collecting hopper 12 to the drive unit 23, a gate opening-closing linkage mechanism of the collecting hopper 12 is immediately engageably coupled to a motor-driven driver arm of the drive unit 23. These coupling structures are not illustrated in detail in the drawings.

In the combination scale according to this embodiment, the basic structure of which has so far been described, the following structural means are employed to facilitate disassembling and reassembling of the hoppers 7 to 9 and 12 removed for cleaning from the drive units 20, 21, and 23. In the description given below, "inner side (inward)" refers to a side nearer to the center base 1, "outer side (outward)" refers to a side away from the center base 1, and "left(ward)-right(ward)" refers to a horizontal direction orthogonal to the direction to and from the inner and outer sides.

Feeding Hopper 7

Figure 3:
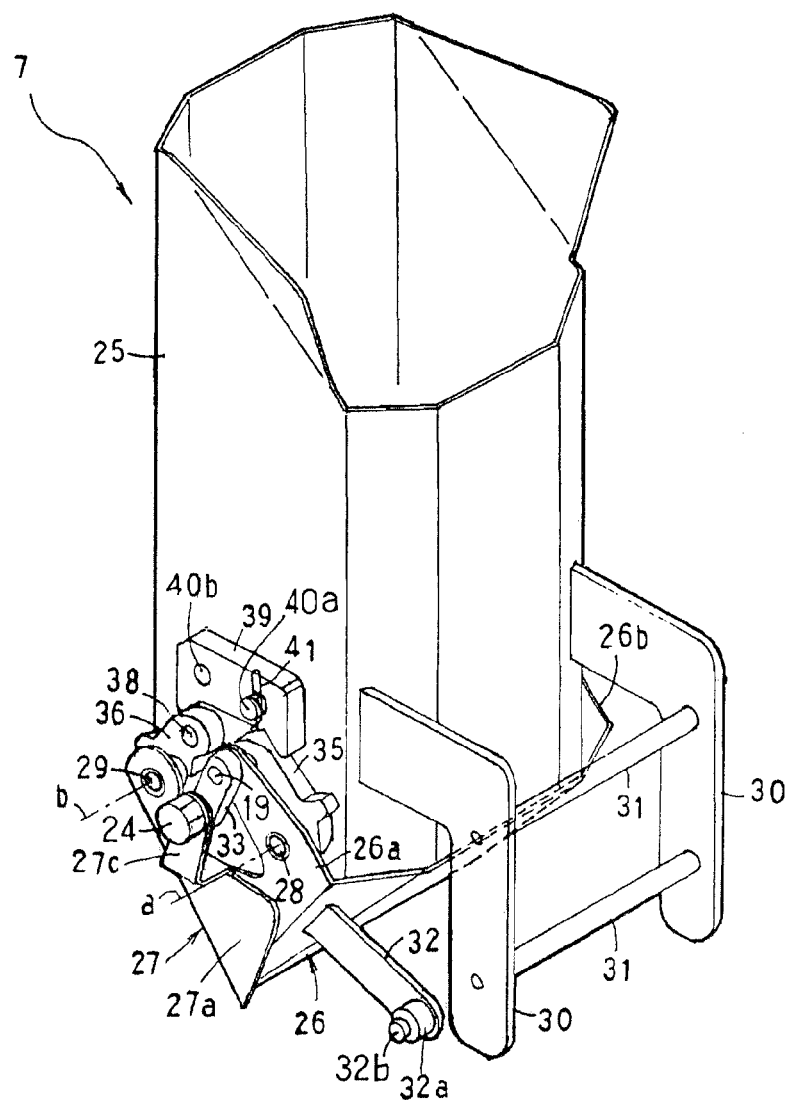
FIG. 3 is a perspective view of a feeding hopper.
Figure 4:
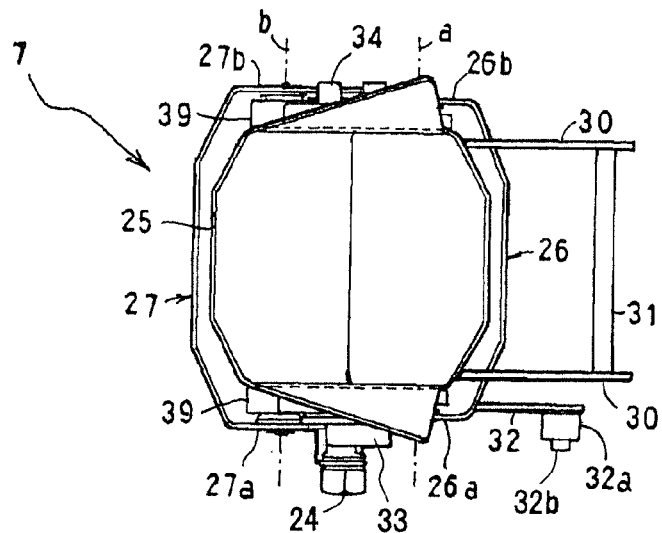
FIG. 4 is a plane view of the feeding hopper.
Figure 5:
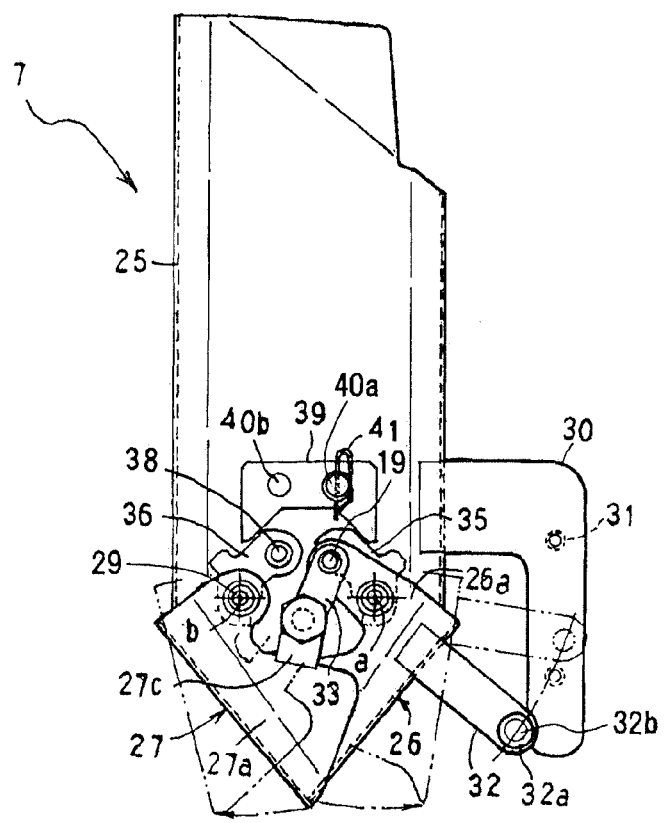
FIG. 5 is a side view of the feeding hopper.
Figure 6:
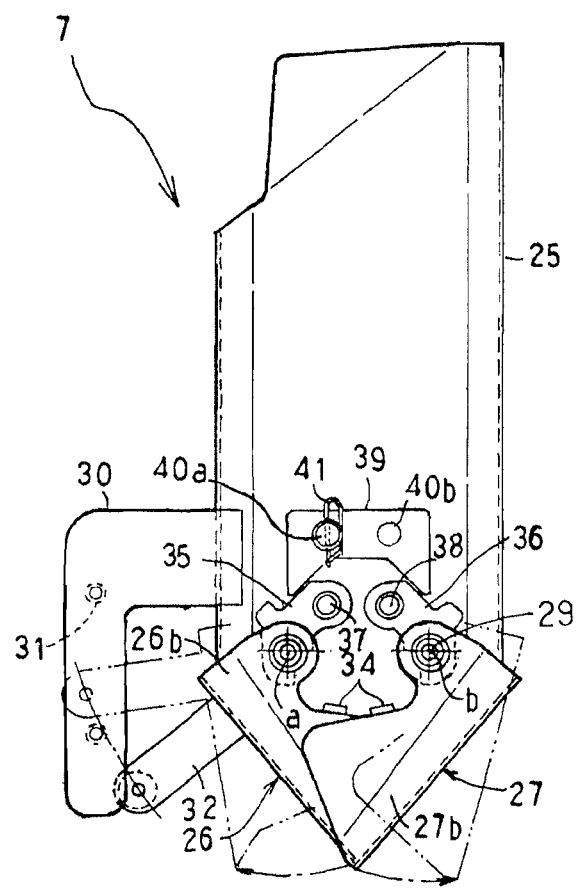
FIG. 6 is another side view of the feeding hopper.
Figure 7:
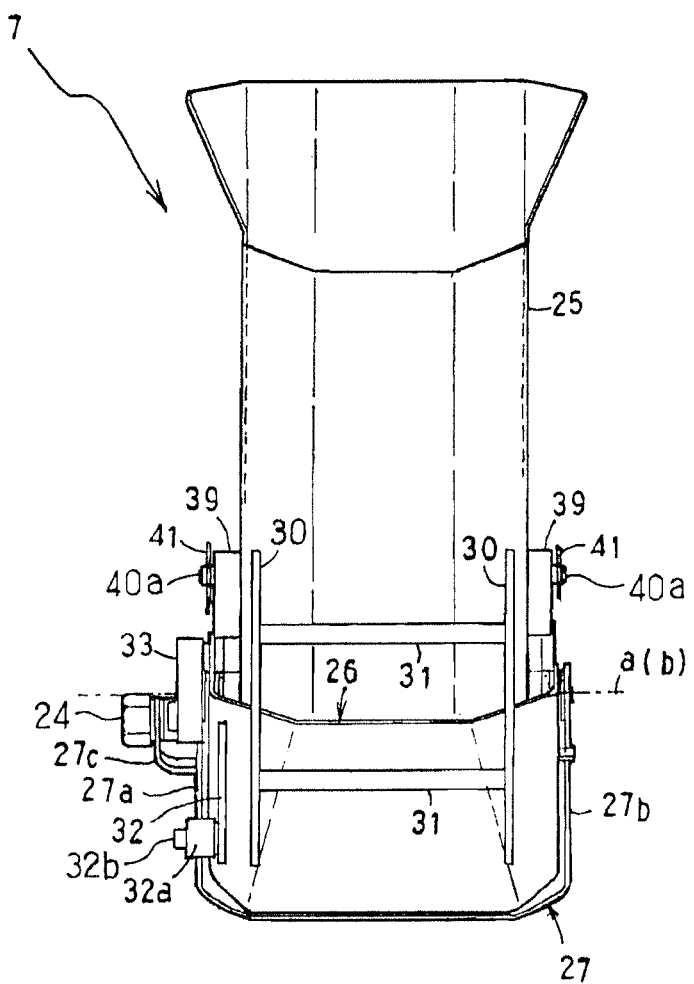
FIG. 7 is a back-side view of the feeding hopper.

FIGS. 3 to 14 illustrate the feeding hopper 7 to detail. FIG. 3 is a perspective view of the feeding hopper 7. FIG. 4 is a plane view of the feeding hopper 7. FIG. 5 is a side view of the feeding hopper 7. FIG. 6 is another side view of the feeding hopper 7. FIG. 7 is a back-side view of the feeding hopper.

The feeding hopper 7 includes a body 25 having openings on its upper and lower sides. The hopper body 25 has the shape of a vertically long angular tube. The feeding hopper 7 further includes, an inner gate 26 and an outer gate 27 facing each other and coupled to a lower part of the hopper body 25. The gates 26 and 27 are coupled to horizontal side surfaces on left and right of the hopper body 25. The gates 26 and 27 are respectively pivotable around fulcrums "a" and "b", being supported by fulcrum shafts 28 and 29 horizontally and laterally aligned. The lower opening of the hopper body 25 is opened and closed by pivoting the inner and outer gates 26 and 27.

From the back surface of the hopper body 25 are protruding coupling brackets 30 that are paired on left and right sides. The brackets 30 have a reversed L shape. At upper and lower positions on the front edge side of the coupling brackets 30, coupling rods 31 are horizontally laid across the brackets 30. A metal fixture is provided at an upper position on the outside of the drive unit 20. By engageably pushing the coupling rods 31 of the coupling brackets 30 into upper and lower hooks of this metal fixture, the feeding hopper 7 is coupled to and supported by the drive unit 20 in a constant posture. This support structure however, is not illustrated in the drawings.

From the left and right side ends of the inner gate 26, opposing side parts 26a and 26b are extending in a bent shape with the hopper body 25 interposed therebetween. An interval between the opposing side parts 26a and 26b is set to an inside dimension greater than a lateral width of the hopper body 25. From the left and right side ends of the outer gate 27, opposing side parts 27a and 27b are similarly extending in a bent shape with the hopper body 25 and the inner gate 26 interposed therebetween. An interval between the opposing side parts 27a and 27b is set to an inside dimension large enough to contain the inner gate 26 from its laterally outer sides.

An operation arm 32 is extending rearward from the opposing side part 26a on one side of the inner gate 26. The operation arm 32 has a pin 32b at its edge, and a roller 32a is pivotably attached to the pin 32b. A retaining piece is attached to the pin 32b. This retaining piece is structured similarly to a retaining piece 41 described later.

The opposing side part 26a of the inner gate 26 and an arm portion 27c extending from the opposing side part 27a of the outer gate 27 are pivotably coupled to each other via a coupling link 33. Specifically, a coupling pin 19 of the opposing side part 26a is inserted in a coupling hole on one end side of the coupling link 33. A positioning pin is attached to the arm portion 27c of the opposing side part 27a with a cap 24 mounted thereon. This positioning pin is inserted in a coupling hole on the other end side of the coupling link 33.

When the operation arm 32 is oscillated downward, the inner and outer gates 26 and 27 are pivoted toward each other, thereby closing the lower opening of the hopper body 25, as illustrated with a solid line in FIGS. 5 and 6. When the operation arm 32 is oscillated upward, the inner and outer gates 26 and 27 are pivoted away from each other, thereby opening the lower opening of the hopper body 25, as illustrated with a virtual line in FIGS. 5 and 6.

By mounting the feeding hopper 7 with hooks to the drive unit 20, the roller 32a at the edge of the operation arm 32 is immediately engaged with an engaging groove of a motor-driven driver arm (not illustrated in the drawings) disposed at a position nearer to the drive unit 20. By pivoting the driver arm, the operation arm 32 is oscillated forward and backward.

There are two abutting pieces 34 protruding from the lateral outside side surface on the opposite side of the hopper body 25. As the gates 26 and 27 are pivoted in directions in which they are closed to each other, the abutting pieces 34 receive upper end sides of the opposing side parts 26b and 27b of the gates 26 and 27, so that the gates 26 and 27 are regulated in their predetermined postures of closure.

The inner and outer gates 26 and 27 are structured to be fittable to and removable from the hopper body 25. Next, gate-fitting structural features are described below.

Figure 8:
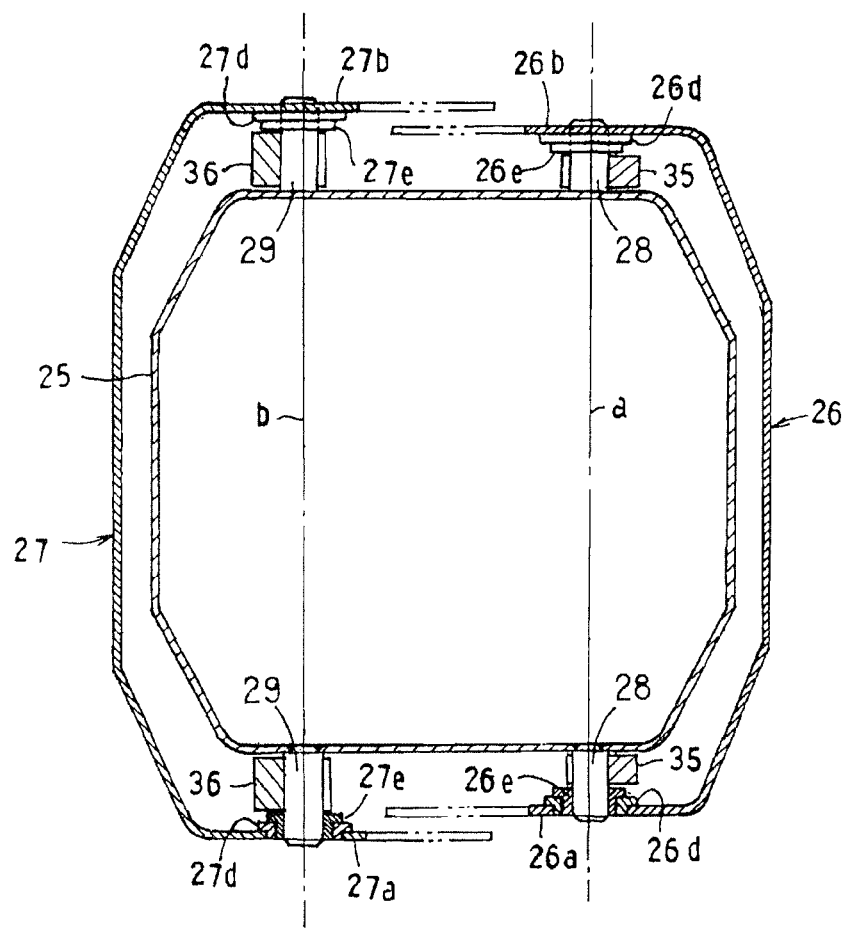
FIG. 8 is a transverse plane view of gates and their fulcrum structures.

FIG. 8 is a transverse plane view of the gates 26 and 27 and their fulcrum structures. As illustrated in FIG. 8, fulcrum bosses 26d and 27d protruding inward are fixed to fulcrum portions of the opposing side parts 26a and 26b of the gate 26 and the opposing side parts 27a and 27b of the gate 27. Further, flanged bearing bushes 26e and 27e are removably inserted in the fulcrum bosses 26d and 27d from their inner sides. The gates 26 and 27 are pivotably and laterally slidably fitted to and supported by the outer side of the fulcrum shafts 28 and 29 of the hopper body 25 via the flanged bearing bushes 26e and 27e.

The opposing side parts 26a and 26b of the gate 26 are, via their fulcrum portions, externally fitted pivotably to the fulcrum shafts 28. The opposing side parts 27a and 27b of the gate 27 are, via their fulcrum portions, externally fitted pivotably to the fulcrum shafts 29.

There are differences between the lateral width of the hopper body 25 and the inside dimensions of the opposing side parts 26a and 26b, and 27a and 27b on the left and right sides of the hopper body. Therefore, the gates 26 and 27 merely fitted to the fulcrum shafts 28 and 29 are movable leftward and rightward to an extent allowed by these dimensional differences. Then, the regulating members 35 and 36 that differ in thickness are interposed between the lateral outer side surfaces of the hopper body 25 and the opposing side parts 26a and 26b, and 27a and 27 of the gates 26 and 27. This may regulate movements of the gates 26 and 27 in axial directions of the fulcrum shafts 28 and 29, i.e., lateral movements along the fulcrum shafts 28 and 29. This may also prevent the gates 26 and 27 from falling off the fulcrum shafts 28 and 29.

Figure 9:
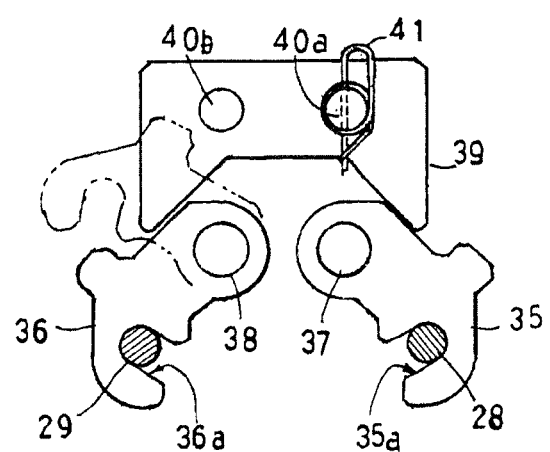
FIG. 9 is a front view of regulating members and a stopper.

As illustrated in FIG. 9, the regulating members 35 and 36 are externally fitted pivotably to mounting shafts 37 and 38 protruding from the lateral outer side surfaces of the hopper body 25. The regulating members 35 and 36 are then pivoted around the mounting shafts 37 and 38. Then, recesses 35a and 36a of the regulating members 35 and 36 are detachably engaged with the fulcrum shafts 28 and 29 circumferentially around these fulcrum shafts between the lateral outer side surfaces of the hopper body 25 and inner ends of the bearing bushes 26e and 27e, as illustrated in FIG. 8.

It may be contemplated that the regulating members 35 and 36 engaged with the fulcrum shafts 28 and 29 are accidentally pivoted upward, i.e., in directions in which their engagements with the fulcrum shafts 28 and 29 are released, thereby failing off the fulcrum shafts 28 and 29. To avoid that, stoppers 39 are removably attached to the outer side surfaces of the hopper body 25. The stoppers 39 identically structured are respectively attached to the lateral outer side surfaces of the hopper body 25. The stoppers 39 each act on one of pairs of regulating members 35 and 36.

Figure 10:
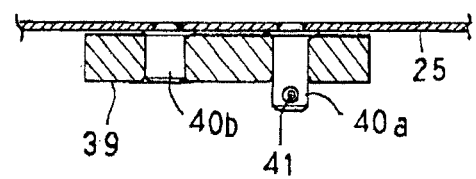
FIG. 10 is a transverse plane view of a stopper-fixing structure.

The hopper body 25 has pairs of support pins 40a and 40b respectively protruding from its outer side surfaces. The stoppers 39 are fitted in these support pins 40a and 40b from their lateral sides. This may have the stoppers 39 keep their certain operational postures in proximity of the regulating members 35 and 36. FIG. 10 is a transverse planar view of a stopper-fixing structure. As illustrated in this drawing, retaining pieces 41 each formed of a bent wire material are inserted through small-diameter through holes formed in protruding parts of the support pins 40a to securely locate the stoppers 39 at predetermined operational positions.

As the need arises, the feeding hopper 7 thus structurally characterized may be removed from the drive unit 20 and cleaned. By disassembling the gates 26 and 27 from the hopper body 25, the feeding hopper 7 may be easily and thoroughly cleaned.

Referring to the plane views of FIGS. 11 to 14 illustrated similarly to FIG. 8, steps of disassembling the gates 26 and 27 are hereinafter described.

To start with, the retaining pieces 41 are pulled out from the support pins 40a to remove the stoppers 39 from the support pins 40a and 40b. Next, the regulating members 35 and 36 are pivoted upward around the mounting shafts 37 and 38 and thereby disengaged from the fulcrum shafts 28 and 29. The regulating members 35 and 36 are further pivoted until they reach positions off the opposing side parts 26a and 26b, 27a and 27b of the gates 26 and 27. The regulating members 35 and 36 are then detached from the mounting shafts 37 and 38.

Figure 11:
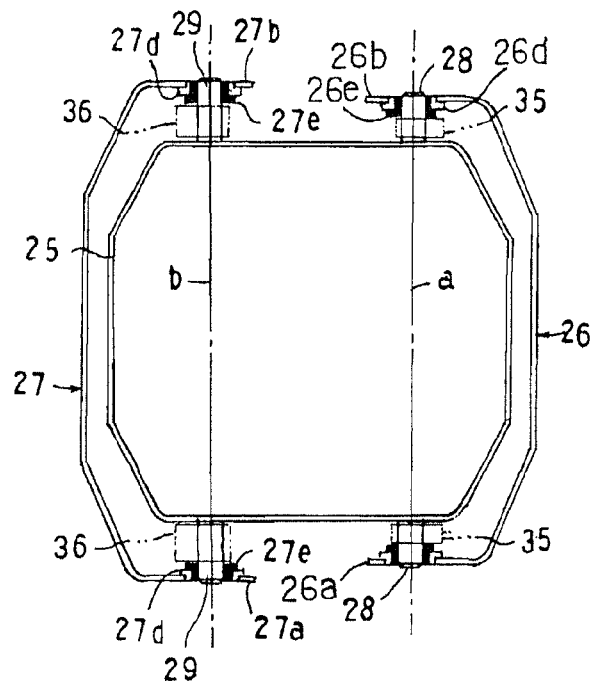
FIG. 11 is a plane view of gate removing steps.

After the removal of the regulating members 35 and 36 is completed on both sides of the hopper body 25, the inner and outer gates 26 and 27 are movable laterally along the fulcrum shafts 28 and 29, as illustrated in FIG. 11.

Figure 12:
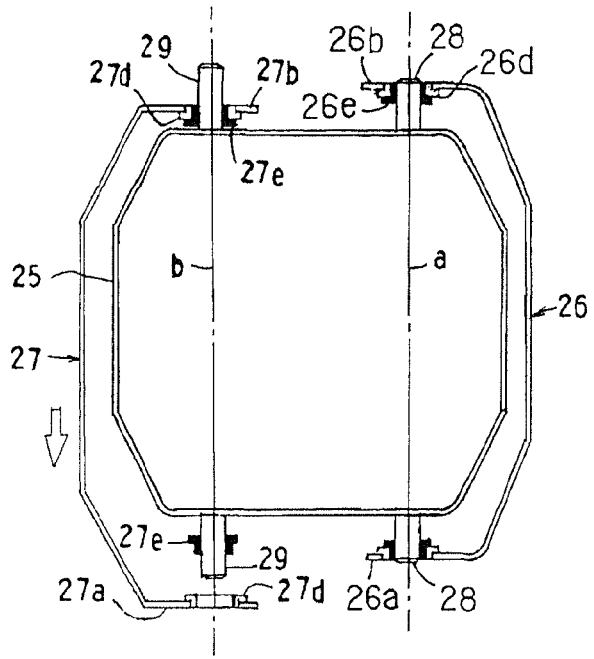
FIG. 12 is a plane view of the gate removing steps.

Then, the outer gate 27 is moved to a large extent in one of the leftward and rightward directions, so that the opposing side part 27a, which is fitted to one of the fulcrum shafts 29 on the left and right sides, for example, is removed from the fulcrum shafts 29 on one side, as illustrated in FIG. 12. At the time, the bearing bush 27e on the opposing side part 27a is pulled out inward from the fulcrum boss 27d and left on the fulcrum shaft 29, and the positioning pin of the arm portion 27c of the opposing side part 27a is pulled out of the coupling hole of the coupling link 33.

Figure 13:
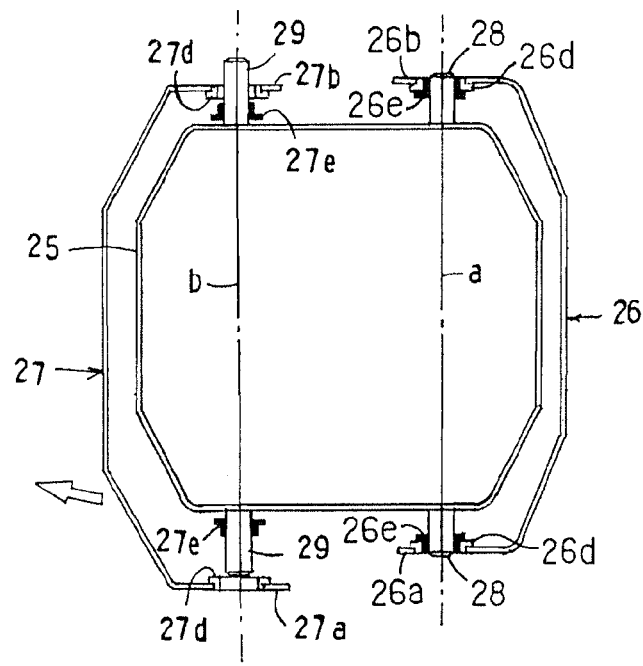
FIG. 13 is a plane view of the gate removing steps.

As illustrated in FIG. 13, the gate 27 is then slightly moved in the opposite direction, so that the bearing bush 27e inserted in the fulcrum boss 27d of the opposing side part 27b on the other side is pulled out inward to leave a clearance between the fulcrum boss 27d and the fulcrum shaft 29.

Figure 14:
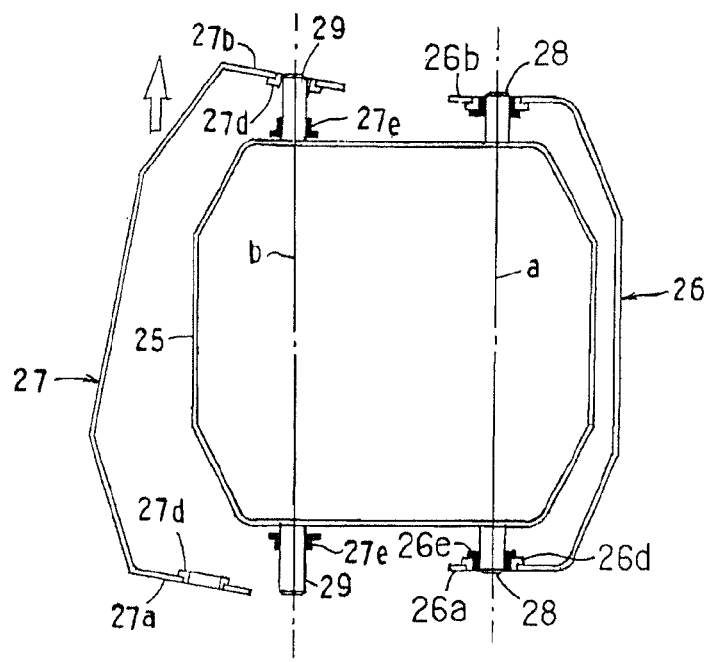
FIG. 14 is a plane view of the gate removing steps.

As illustrated in FIG. 14, the gate 27 is inclined and moved, in the inclined posture laterally outward to a large extent allowed by the clearance between the fulcrum boss 27d and the fulcrum shaft 29, so that the opposing side part 27b fitted to the fulcrum shaft 29 on the other side is detached from this fulcrum shaft.

Then, the coupling hole of the coupling link 33 is detached from the coupling pin 19 of the inner gate 26 to pull out the coupling link 33. In steps similar to the steps described so far, the inner gate 26 is detached from the fulcrum shafts 28.

In order to reassemble the gates 26 and 27 to the hopper body when the cleaning is over, the above-described steps of removing these gates are carried out in the reverse order as follows.

The bearing bushes 26e are fitted in the fulcrum shafts 28 on both sides of the hopper body 25, and, for example, the opposing side part 26a on one side of the inner gate 26 is fitted to the fulcrum shaft 28 on one side. Then, the gate 26 is moved in the other one of the leftward and rightward directions, and the opposing side part 26b on the other side thereof is fitted to the fulcrum shaft 28 on the other side to have the inner gate 26 be fitted to the hopper body. After that, the left and right bearing bushes 26e are inserted in the fulcrum bosses 26d of the left and right opposing side parts 26a and 26b. Then, the regulating members 35 fitted to the mounting shafts 37 are pivoted to be engaged with the fulcrum shafts 28 between the lateral outer side surfaces of the hopper body 25 and the bearing bushes 26e of the opposing side parts 26a and 26b.

Then, the coupling hole on one end side of the coupling link 33 is fitted to the coupling pin 19 of the opposing side part 26a on one side.

The bearing bushes 27e are fitted to the fulcrum shafts 29 on the left and right sides of the hopper body 25, and the opposing side part 27b on the other side of the outer gate 27 is fitted to the fulcrum shaft 29 on the other side. Then, the gate 27 is moved in one of leftward and rightward directions, and the opposing side part 27a on one side is fitted to the fulcrum shaft 29 on the other side. Further, the positioning pin of the arm portion 27c extending from the opposing side part 27a is inserted in the coupling hole on the other end side of the coupling link 33 to have the outer gate 27 be fitted to the hopper body. Then, the bearing bushes 27e on the left and right sides are inserted in the fulcrum bosses 27d of the opposing side parts 27a and 27b on the both sides. Then, the regulating members 36 fitted to the mounting shafts 38 are pivoted and engaged with the fulcrum shafts 29 between the lateral outer side surfaces of the hopper body 25 and the bearing bushes 27e of the opposing side parts 27a and 27b. Finally, the stoppers 39 are, attached to the support pins 40a and 40b, and the retaining pieces 41 are inserted in the support pins 40a. Then, the reassembling steps are over.

Weighing Hopper

Figure 15:
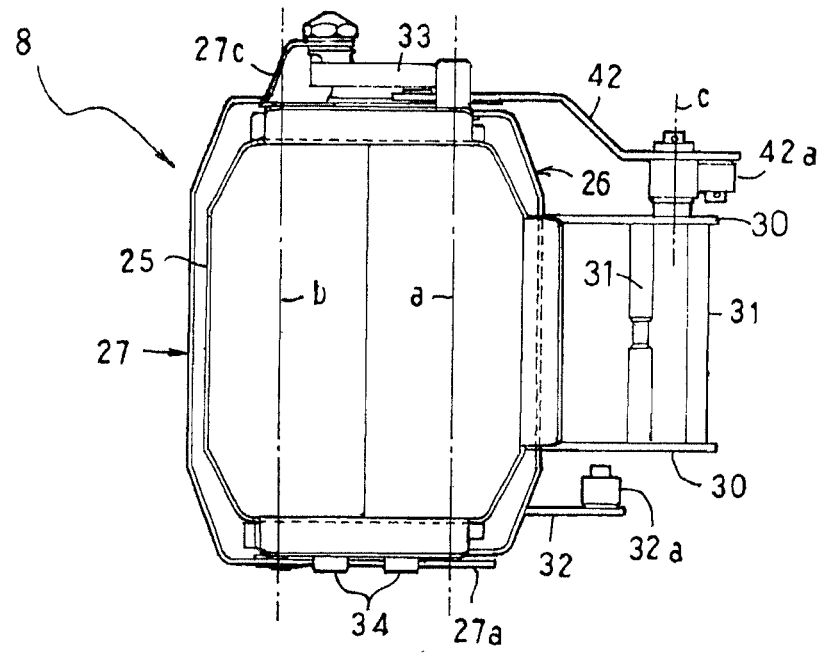
FIG. 15 is a plane view of a weighing hopper.
Figure 16:
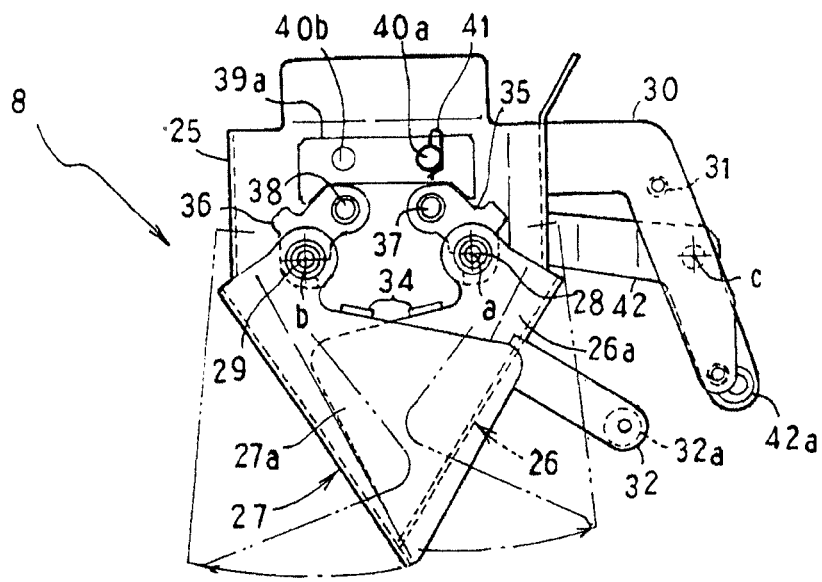
FIG. 16 is a side view of the weighing hopper.
Figure 17:
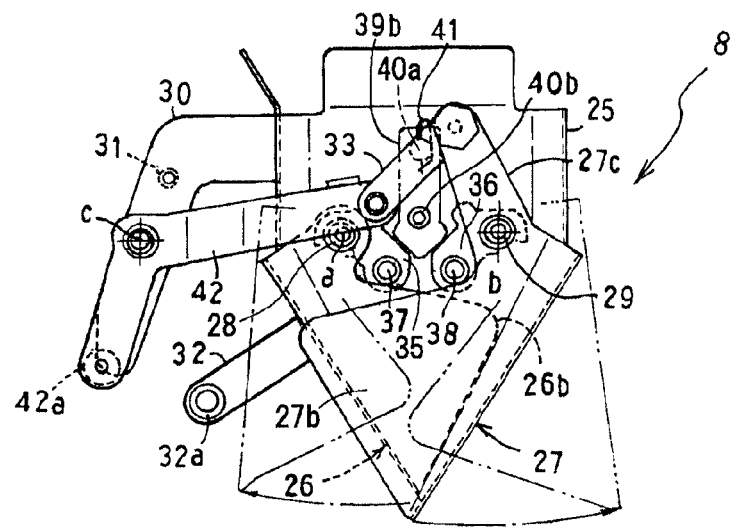
FIG. 17 is another side view of the weighing hopper.
Figure 18:
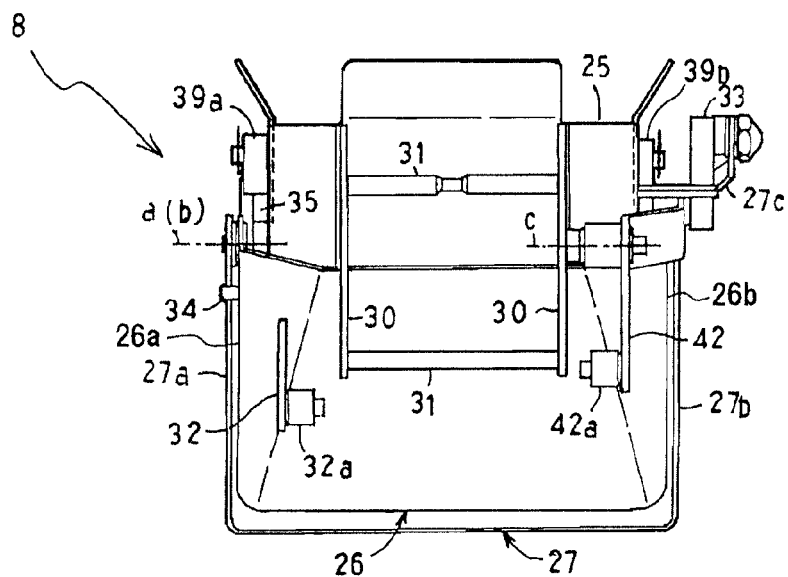
FIG. 18 is a back-side view of the weighing hopper.

FIGS. 15 to 19 illustrate the weighing hopper 8 to detail. FIG. 15 is a plane view of the weighing hopper 8. FIG. 16 is a side view of the weighing hopper 8. FIG. 17 is another side view of the weighing hopper 8. FIG. 18 is a back-side view of the weighing hopper 8.

Any components of the weighing hopper 8 functionally similar to those of the feeding hopper 7 are illustrated with the same reference signs.

The weighing hopper 8, except its gate opening and closing structural features, is essentially configured similarly to the feeding hopper 7. The weighing hopper 8 includes a body 25 having openings on its upper and lower sides. The hopper body 25 has the shape of a vertically long angular tube. The weighing hopper 8 further includes an inner gate 26 and an outer gate 27 facing each other and coupled to a lower part of the hopper body 25. The gates 26 and 27 are coupled to lateral outside side surfaces on the left and right sides of the hopper body 25. The gates 26 and 27 are respectively pivotable around fulcrums "a" and "b", being supported by fulcrum shafts 28 and 29 horizontally and laterally aligned.

From the back surface of the hopper body 25 are protruding coupling brackets 30 that are paired on left and right sides. At upper and lower positions on the front edge side of the coupling brackets 30, coupling rods 31 are horizontally laid across the brackets 30. A metal fixture is provided, which is supported by the weight sensor of the drive unit 20. By engageably pushing the coupling rods 31 of the coupling brackets 30 into upper and lower hooks of this metal fixture, the weighing hopper 8 is coupled to and supported by the drive unit 20 in a constant posture. This support structure, however, is not illustrated in the drawings.

From the left and right side ends of the inner gate 26, opposing side parts 26a and 26b are extending in a bent shape with the hopper body 25 interposed therebetween. An interval between the opposing side parts 26a and 26b is set to an inside dimension greater than a lateral width of the hopper body 25. From the left and right side ends of the outer gate 27, opposing side parts 27a and 27b are similarly extending in a bent shape with the hopper body 25 and the inner gate 26 interposed therebetween. An interval between the opposing side parts 27a and 27b is set to an inside dimension large enough to contain the inner gate 26 from its laterally outer sides.

An operation arm 32 is extending rearward from the back side of the inner gate 26. The operation arm 32 has a roller 32a at its edge part. When the operation arm 32 is oscillated upward and downward, the inner gate 26 is pivoted to open and close an inner opening part of the lower opening of the hopper body 25.

Another operation arm 42 in a bent shape is further provided. The bending part of this operation arm 42 is coupled to the outer side of one of the coupling brackets 30. The bending part is pivotable around a fulcrum "c" laterally extending. The operation arm 42 is supported by a retaining piece, not illustrated in the drawings, not to detach from the coupling bracket 30. One end part of the operation arm 42 and an arm portion 27c extending from the opposing side part 27b of the outer gate 27b are coupled to each other with a coupling link 33. The operation arm 42 has a roller 42a at the other end part thereof.

When the operation arm 42 is oscillated upward and downward, the outer gate 27 is pivoted to open and close an outer opening part of the lower opening of the hopper body 25.

The roller 32a of the operation arm 32 and the roller 42a of the operation arm 42 are prevented by retaining pieces, not illustrated in the drawings, from falling off the arms 32 and 42.

By mounting the weighing hopper 8 with hooks to the drive unit 20, the rollers 32a and 42a at edges of the operation arms 32 and 42 are immediately engaged with engaging grooves of two motor-driven driver arms (not illustrated in the drawings) disposed at positions nearer to the drive unit 20. By separately pivoting the driver arms, the operation arms 32 and 42 are independently oscillated, so that the inner and outer gates 26 and 27 are driven to open and close separately. As illustrated in FIG. 1, when the inner gate 26 opens, weighed articles are received and temporarily stored in the memory hopper 9. When the outer gate 27 opens, the weighed articles are immediately discharged into a collecting chute 10.

There are two abutting pieces 34 protruding from one of the lateral outer side surfaces of the hopper body 25. As the gates 26 and 27 are pivoted in directions in which they are closed to each other, the abutting pieces 34 receive upper end sides of the opposing side parts 26b and 27b of the gates 26 and 27, so that the gates 26 and 27 are regulated in their predetermined postures of closure.

The inner and outer gates 26 and 27 are fitted to the hopper body 25 similarly to the feeding hopper 7. The inner and outer gates 26 and 27 are structured to be easily fittable to and removable from the hopper body 25.

Figure 19:
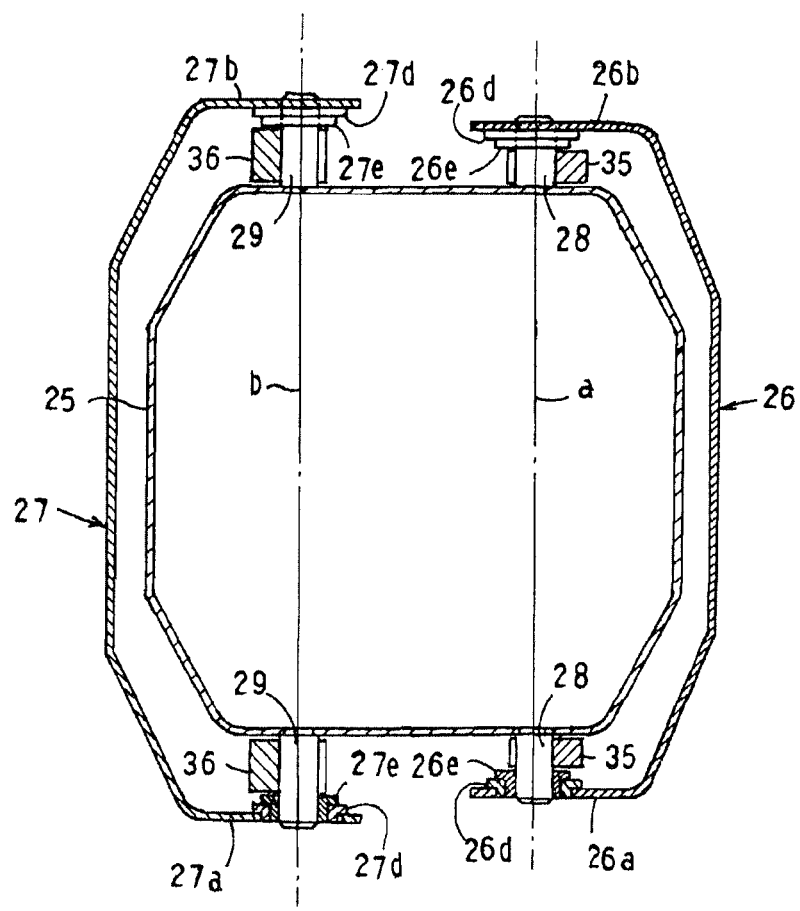
FIG. 19 is a transverse plane view of gates and their fulcrum structures.

FIG. 19 is a transverse plane view of the gates 26 and 27 and their fulcrum structures. As illustrated in this drawing, fulcrum bosses 26d and 27d protruding inward are fixed to fulcrum portions of the opposing side parts 26a and 26b of the gate 26 and the opposing side parts 27a and 27b of the gate 27. Further, flanged bearing bushes 26e and 27e are inserted in the fulcrum bosses 26d and 27d from their inner sides. The gates 26 and 27 are pivotably and laterally slidably fitted to and supported by the fulcrum shafts 28 and 29 of the hopper body 25 via the flanged bearing bushes 26e and 27e.

Then, regulating members 35 and 36 having predetermined thicknesses are interposed between the lateral outer side surfaces of the hopper body 25 and the opposing side parts 26a and 26b, and 27a and 27 of the gates 26 and 27. This may regulate leftward and rightward movements of the gates 26 and 27 and prevent the gates 26 and 27 from falling off the fulcrum shafts 28 and 29.

The regulating members 35 and 36 are externally fitted pivotably to mounting shafts 37 and 38 protruding from the lateral outer side surfaces of the hopper body 25 illustrated in FIGS. 16 and 17. By pivoting the regulating members 35 and 36 around the mounting shafts 37 and 38, recesses of the regulating members 35 and 36 are engaged with the fulcrum shafts 28 and 29 circumferentially around these fulcrum shafts from their upper sides.

It may be contemplated that the regulating members 35 and 36 engaged with the fulcrum shafts 28 and 29 are accidentally pivoted upward, falling off the fulcrum shafts 28 and 29. To avoid that, stoppers 39a and 39b are removably attached to the lateral outer side surfaces of the hopper body 25. The stoppers 39a and 39b are shaped differently. The stoppers 39a and 39b are respectively attached to the lateral outer side surfaces on both sides of the hopper body 25. The stoppers 39a and 39b each act on one of pairs of regulating members 35 and 36.

The hopper body 25 has pairs of support pins 40a and 40b respectively protruding from its outer side surfaces. The stoppers 39a and 39b are fitted to the support pins 40a and 40b from their lateral sides, so that the stoppers 39a and 39b keep their certain operational postures in proximity of the regulating members 35 and 36. By inserting retaining pieces 41 each formed of a bent wire material through small-diameter through holes formed in protruding parts of the support pins 40a, the stoppers 39a and 39b are securely located at predetermined operational positions.

As the need arises, the weighing hopper 8 thus structurally characterized may be removed from the drive unit 20 and cleaned. By disassembling the gates 26 and 27 from the hopper body 25, the weighing hopper 8 may be thoroughly cleaned.

The steps of disassembling the gates 26 and 27 from the hopper body are similar to the steps employed for the feeding hopper 7. After the removal of the stoppers 39a and 39b and the regulating members 35 and 36 is completed, the gates 26 and 27 are successively detached from the fulcrum shafts 28 and 29.

The steps of reassembling the gates 26 and 27 to the hopper body when the cleaning is over are also similar to the steps employed for the feeding hopper 7

The bearing bushes 26e are fitted to the fulcrum shafts 28 on the left and right sides of the hopper body 25, and the inner gate 26 is fitted to the fulcrum shafts 28. Then, the regulating members 35 are engaged with the fulcrum shafts 28, the operation arms, and then, the coupling link 33 are respectively attached to the predetermined positions.

The bearing bushes 27e are then fitted to the fulcrum shafts 29 on the left and right sides of the hopper body 25, and the outer gate 27 is fitted to the fulcrum shafts 29 and coupled to the coupling link 33. Then, the regulating members 36 are engaged with the fulcrum shafts 29. Finally, the stoppers 39a and 39b, and then, the retaining pieces 41 are respectively fitted to their predetermined positions.

Memory Hopper 9

Figure 20:
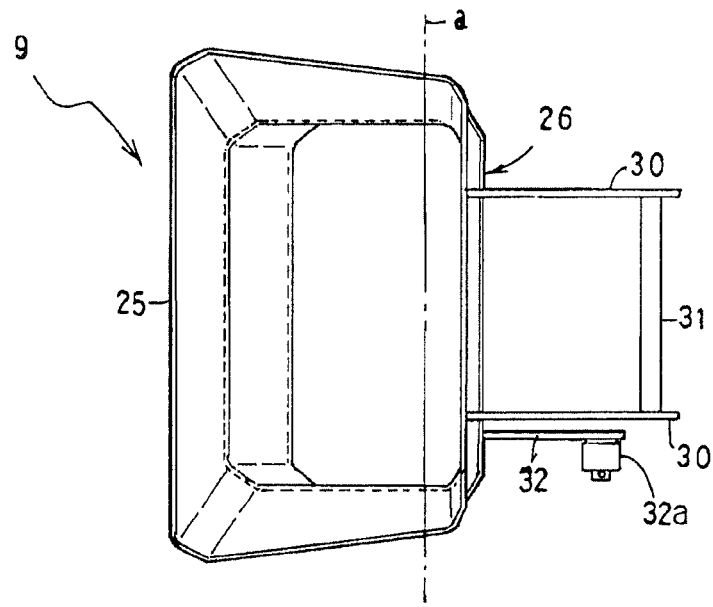
FIG. 20 is a plane view of a memory hopper.
Figure 21:
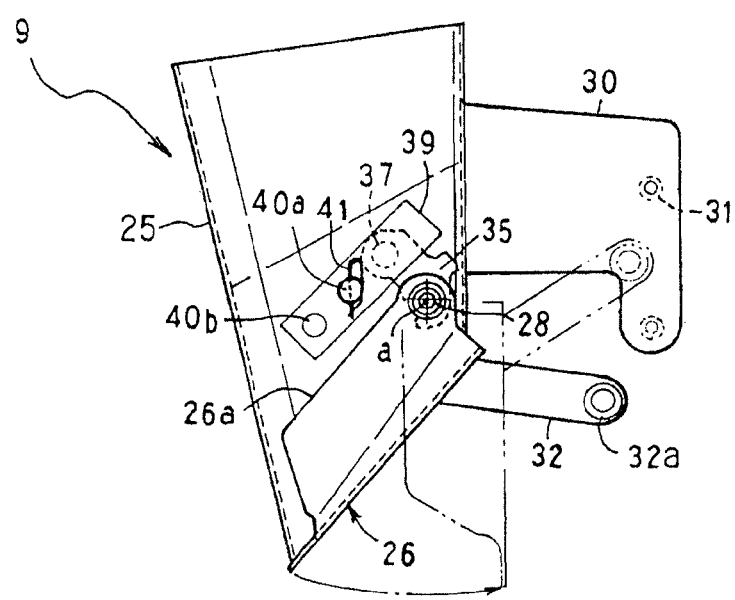
FIG. 21 is a side view of the memory hopper.
Figure 22:
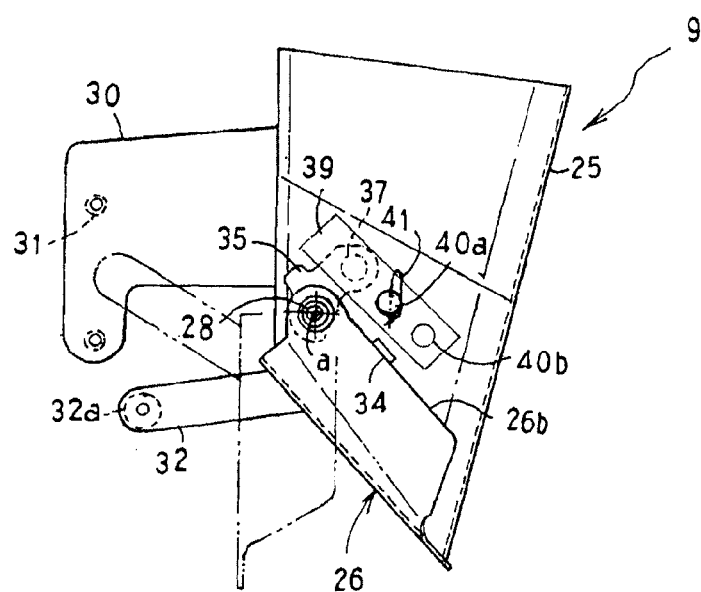
FIG. 22 is another side view of the memory hopper.
Figure 23:
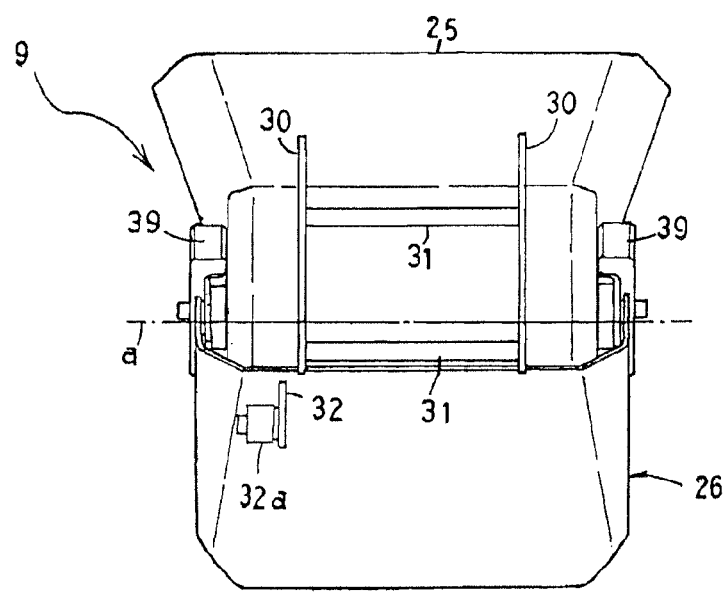
FIG. 23 is a back-side view of the memory hopper.

FIGS. 20 to 25 illustrate the memory hopper 9 to detail. FIG. 20 is a plane view of the memory hopper 9. FIG. 21 is a side view of the memory hopper 9. FIG. 22 is another side view of the memory hopper 9. FIG. 23 is a back-side view of the memory hopper 9.

Any components of the memory hopper 9 functionally similar to those of the feeding hopper 7 are illustrated with the same reference signs.

The memory hopper 9 includes a body 25 having openings on its upper and lower sides. The hopper body 25 has the shape of a vertically long angular tube. The memory hopper 9 further includes a single gate 26 coupled to a lower part of the hopper body 25. The gate 26 is coupled to lateral outside side surfaces on the left and right sides of the hopper body 25. The gate 26 is pivotable around a fulcrum "a", being supported by fulcrum shafts 28 horizontally and laterally aligned.

From the back surface of the hopper body 25 are protruding coupling brackets 30 that are paired on left and right sides. At upper and lower positions on the front edge side of the coupling brackets 30, coupling rods 31 are horizontally laid across the brackets 30. A metal fixture is provided at an upper position on the outside of the drive unit 23. By engageably pushing the coupling rods 31 of the coupling brackets 30 into upper and lower hooks of this metal fixture, the memory hopper 9 is supported by the drive unit 21 in a constant posture. This support structure, however, is not illustrated in the drawings.

From the left and right sides of the inner gate 26, opposing side parts 26a and 26b are extending in a bent shape with the hopper body 25 interposed therebetween. An interval between the opposing side parts 26a and 26b is set to an inside dimension greater than a lateral width of the hopper body 25.

An operation arm 32 is extending rearward from the back surface of the gate 26. The operation arm 32 has a roller 32a at its edge part. The roller 32a is prevented by a retaining piece, not illustrated in the drawings, from falling off the operation arm 32. When the operation arm 32 is oscillated upward and downward, the gate 26 is pivoted to open and close the lower opening of the hopper body 25.

By mounting the memory hopper 9 with hooks to the drive unit 21, the roller 32a at the edge of the operation arm 32 is engaged with an engaging groove of a motor-driven driver arm (not illustrated in the drawings) disposed at a positions nearer to the drive unit 21. The operation arm 32 is oscillated by pivoting the driver arm.

An abutting piece 34 is protruding from the lateral outer side surface on the other side of the hopper body 25. When the gate 26 is pivoted in the direction of closure, the abutting piece 34 receives an upper end side of the 30 opposing side part 26a of the gate 26, so that the gate 26 is regulated in a predetermined posture of closure The gate 26 is fitted to the hopper body 25 similarly to the feeding hopper 7. The gate 26 is structured to be easily fittable to and removable from the hopper body 25.

Figure 24:
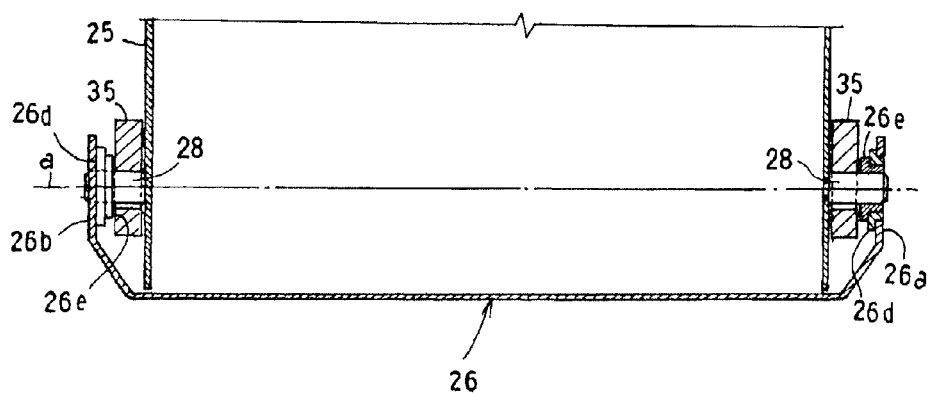
FIG. 24 is a longitudinal front view ala gate and its fulcrum structure.

FIG. 24 is a longitudinal front view of the gate 26 and its fulcrum structure. As illustrated in this drawing, fulcrum bosses 26d protruding inward are fixed to fulcrum portions of the opposing side parts 26a and 26b of the gate 26. Further, flanged bearing bushes 26e are inserted, in the fulcrum bosses 26d from their inner sides. The gate 26 is pivotably and laterally slidably fitted to and supported by the fulcrum shafts 28 of the hopper body 25 via the flanged hearing bushes 26e.

Then, regulating members 35 having predetermined thicknesses are interposed between the lateral outer side surfaces of the hopper body 25 and the opposing side parts 26a and 26b of the gate 26. This may regulate leftward and rightward movements of the gate 26 and prevent the gate 26 from falling off the fulcrum shafts 28.

The regulating members 35 are externally fitted pivotably to mounting shafts 37 protruding from the lateral outer side surfaces of the hopper body 25 illustrated in FIGS. 21 and 22. By pivoting the regulating members 35 around the mounting shafts 37, recesses of the regulating members 35 are engaged with the fulcrum shafts 28 circumferentially around these fulcrum shafts from their upper sides.

It may be contemplated that the regulating members 35 engaged with the fulcrum shafts 28 are accidentally pivoted upward, falling off the fulcrum shafts 28. To avoid that, stoppers 39 are removably attached to the lateral outer side surfaces of the hopper body 25.

Figure 25:
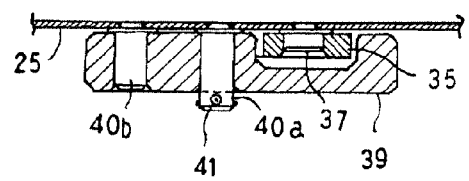
FIG. 25 is transverse plane view of a stopper-fixing structure.

The hopper body 25 has pairs of support pins 40a and 40b respectively protruding from its lateral outer side surfaces. As illustrated in FIG. 25, the stoppers 39 are fitted to these support pins 40a and 40b from their lateral sides, so that the stoppers 39 keep their certain operational postures that allow them to be engaged with the regulating members 35. By inserting retaining pieces 41 each formed of a bent wire material through small-diameter through holes formed in protruding parts of the support pins 40a, the stoppers 39 are securely located at predetermined operational positions.

As the need arises, the memory hopper 9 thus structurally characterized may be removed from the drive unit 21 and cleaned. By disassembling the gate 26 from the hopper body 25, the memory hopper 9 may be thoroughly cleaned.

The steps of disassembling the gate 26 are similar to the steps employed for the feeding hopper 7. After the removal of the stoppers 39 and the regulating members 35 is completed, the gate 26 is removed from the fulcrum shafts 28 of the hopper body 25.

The steps of assembling the gate 26 are similar to the steps employed for the feeding hopper 7. After the gate 26 is fitted to the fulcrum shafts 28 of the hopper body 25, the stoppers 39 and the regulating members 35 are respectively fitted to their predetermined positions.

Collecting Hopper 12

Figure 26:
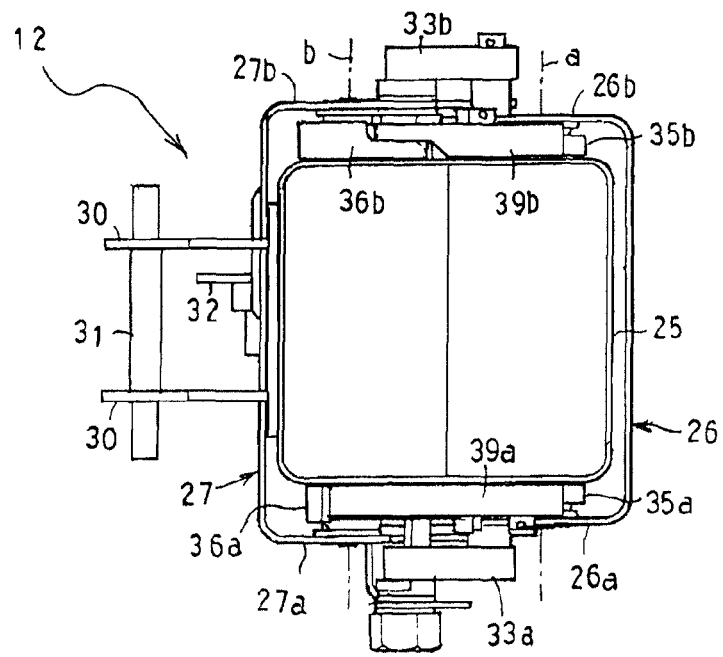
FIG. 26 is a plane view of a collecting hopper.
Figure 27:
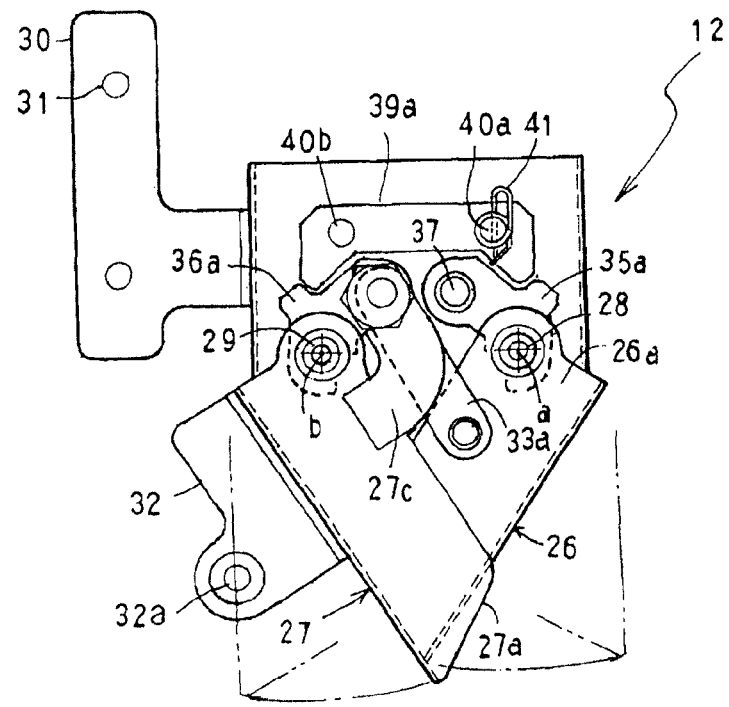
FIG. 27 is a side view of the collecting hopper.
Figure 28:
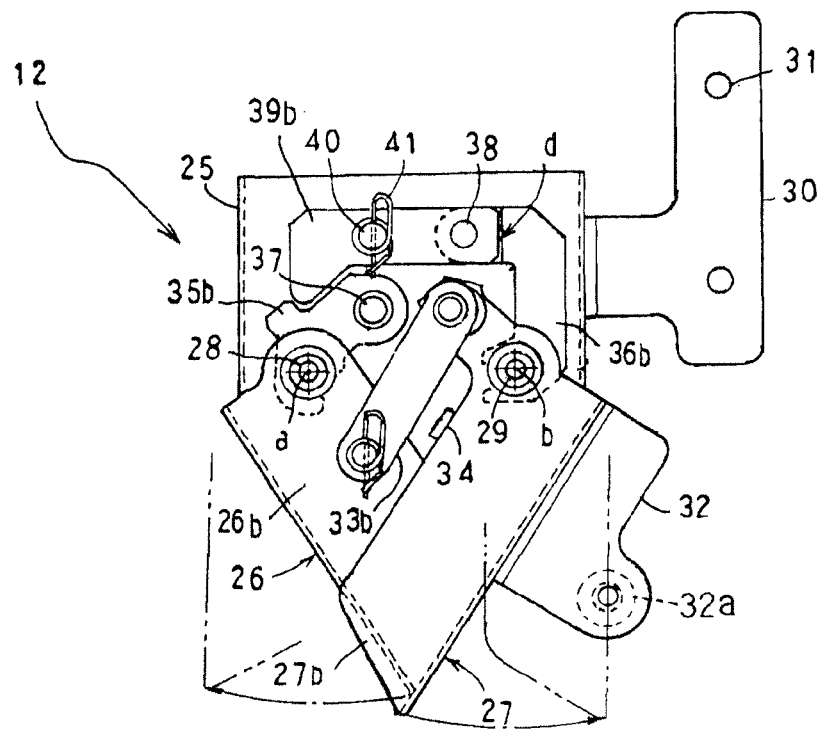
FIG. 28 is another side view of the collecting hopper.
Figure 29:
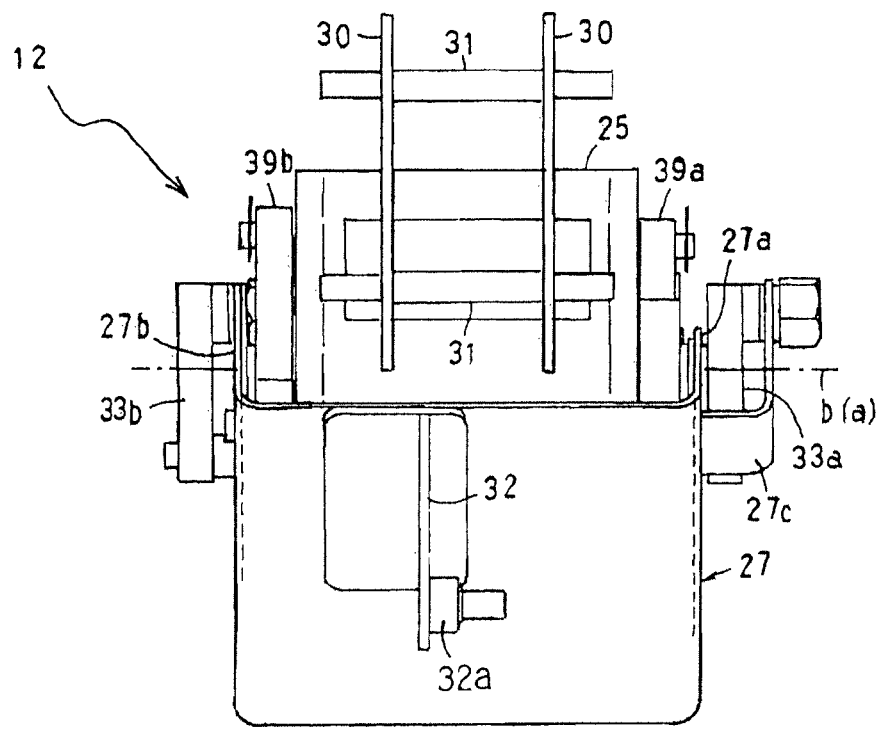
FIG. 29 is a back-side view of the collecting hopper.

FIGS. 26 to 31 illustrate the collecting hopper 12 to detail. FIG. 26 is a plane view of the collecting hopper 12. FIG. 27 is a side view of the collecting hopper 12. FIG. 28 is another side view of the collecting hopper 12. FIG. 29 is a back-side view of the collecting hopper 12.

Any components of the collecting hopper 12 functionally similar to those of the feeding hopper 7 are illustrated with the same reference signs.

The collecting hopper 12 is essentially configured similarly to the feeding hopper 7. The collecting hopper 12 includes a body 25 having openings on its upper and lower sides. The hopper body 25 has the shape of a vertically long angular tube. The collecting hopper 12 further includes an inner gate 26 and an outer gate 27 facing each other and coupled to a lower part of the hopper body 25. The gates 26 and 27 are coupled to lateral outside surfaces on the left and right sides of the hopper body 25. The gates 26 and 27 are pivotable around fulcrums "a" and "b", being supported by fulcrum shafts 28 and 29 horizontally aligned.

From the back surface of the hopper body 25 are protruding coupling brackets 30 that are paired on left and right sides. At upper and lower positions on the front edge side of the coupling brackets 30, coupling rods 31 are horizontally laid across the brackets 30. A metal fixture is provided at an upper position on the outside of the drive unit 23. By engageably pushing the coupling rods 31 of the coupling brackets 30 into upper and 10 lower hooks of this metal fixture, the collecting hopper 12 is supported by the drive unit 23 in a constant posture. This support structure, however, is not illustrated in the drawings.

From the left and right sides of the inner gate 26, opposing side parts 26a and 26b are extending in a bent shape with the hopper body 25 interposed therebetween, An interval between the opposing side parts 26a and 26b is set to an inside dimension greater than a lateral width of the hopper body 25. From the left and right sides of the outer gate 27, opposing side parts 27a and 27b are similarly extending in a bent shape with the hopper body 25 and the inner gate 26 interposed therebetween. An interval between the opposing side parts 27a and 27b has an inside dimension large enough to contain the inner gate 26 from its laterally outer sides.

An operation arm 32 is extending rearward from the back surface of the outer gate 27. The operation arm 32 has a roller 32a at its edge part.

As illustrated in FIG. 27, the opposing side part 26a of the inner gate 26 and an arm portion 27c extending from the opposing side part 27a of the outer gate 27 are pivotably coupled to each other via a coupling link 33a. As illustrated in FIG. 28, the opposing side part 27b of the outer gate 27 and the opposing side part 26b of the inner gate 26 are pivotably coupled to each other via a coupling link 33b.

When the operation arm 32 is oscillated downward, the inner gate 26 and the outer gate 27 are pivoted toward each other to close the lower opening of the hopper body 25. When the operation arm 32 is oscillated upward, the inner gate 26 and the outer gate 27 are pivoted away from each other to open the lower opening of the hopper body 25.

By mounting the collecting hopper 12 with hooks to the drive unit 23, the roller 32a at the edge of the operation arm 32 is immediately engaged with an engaging groove of a motor-driven driver arm (not illustrated in the drawings) disposed at a position nearer to the drive unit 20. By pivoting the driver arm, the operation arm 32 is oscillated forward and backward.

An abutting piece 34 is protruding from the lateral outer side surface on the other side of the hopper body 25. As the gate 27 is pivoted in the direction of closure, the abutting piece 34 receives an upper end side of the opposing side part 27b of the gate 27, so that the gates 26 and 27 are regulated in their predetermined postures of closure.

The inner gate 26 and the outer gate 27 are structured to be easily fittable to and removable from the hopper body 25. Next, gate-fitting structural features are described below.

Figure 30:
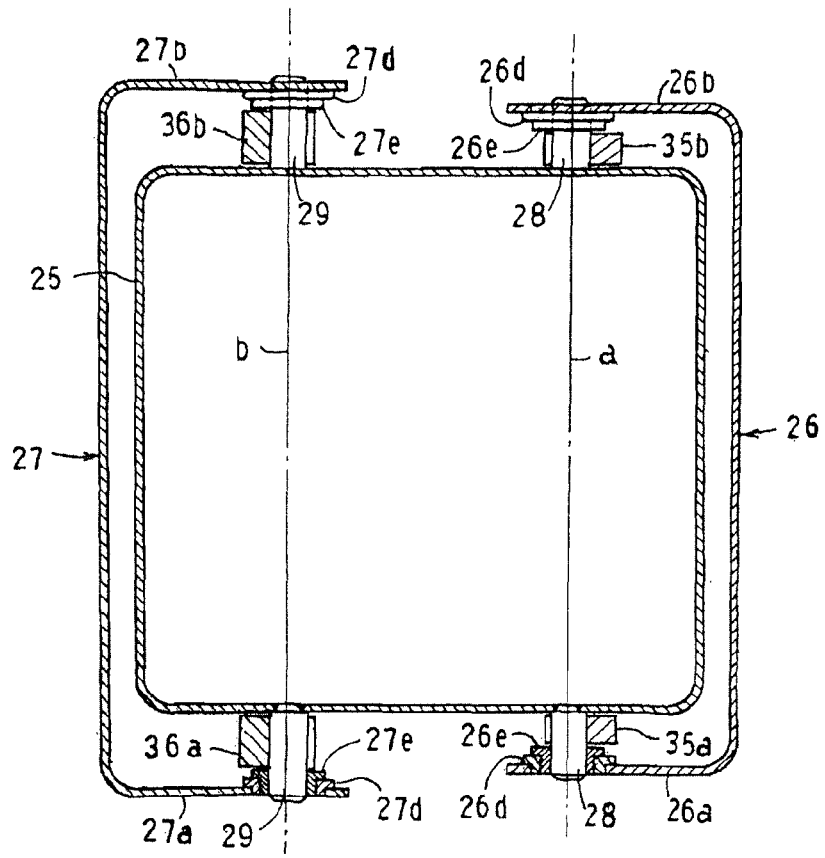
FIG. 30 is a transverse plane view of gates and their fulcrum structures.

FIG. 30 is a transverse plane view of the gates 26 and 27 and their fulcrum structures. As illustrated in this drawing, fulcrum bosses 26d and 27d protruding inward are fixed to fulcrum portions of the opposing side parts 26a and 26b of the gate 26 and the opposing side parts 27a and 27b of the gate 27. Further, flanged bearing bushes 26e and 27e are inserted in the fulcrum bosses 26d and 27d from their inner sides. The gates 26 and 27 are pivotably and slidably fitted to and supported by the fulcrum shafts 28 and 29 of the hopper body 25 via the flanged bearing bushes 26e and 27e.

Regulating members 35A and 35B, and 36A and 36B having predetermined thicknesses are interposed between the lateral outer side surfaces of the hopper body 25 and the opposing side parts 26a and 26b, and 27a and 27 of the gates 26 and 27. This may regulate movements of the gates 26 and 27 in their pivotal directions, i.e., lateral movements along the fulcrum shafts 28 and 29, and prevent the gates 26 and 27 from falling off the fulcrum shafts 28 and 29.

As illustrated in FIG. 27, the regulating members 35A and 36A located near the opposing side parts 26a and 27a are similar in shape to the regulating members of the feeding hopper 7. The regulating members 35A and 36A are externally fitted pivotably to mounting shafts 37 and 38 protruding in juxtaposition from the lateral outer side surfaces of the hopper body 25. By pivoting the regulating members 35A and 36A around the mounting shafts 37 and 38, the regulating members 35A and 36A are engaged with the fulcrum shafts 28 and 29 circumferentially around these fulcrum shafts.

As illustrated in FIG. 28, of the regulating members 35B and 36B on the opposing side parts 26b and 27b, the regulating member 35B for the fulcrum shaft 28 are similar in shape to the regulating member employed in the feeding hopper 7. On the other hand, the regulating member 36B for the fulcrum shaft 29 differs in shape from the regulating member 35B for the fulcrum shafts 28. The regulating member 36B for the fulcrum shaft 29 are externally fitted pivotably to the mounting shaft 38 disposed at a higher position than the mounting shaft 37. By pivoting the regulating members 35B and 36B around the mounting shafts 37 and 38, the regulating members 35B and 36B are engaged with the fulcrum shafts 28 and 29 circumferentially around these fulcrum shafts.

It may be contemplated that the regulating members 35A and 35B, and 36A and 36B engaged with the fulcrum shafts 28 and 29 are accidentally pivoted upward, thereby falling off the fulcrum shafts 28 and 29. To avoid that, stoppers 39a and 39b are removably attached to the lateral outer side surfaces of the hopper body 25.

The stopper 39a on the opposing side parts 26a and 27a is similar in shape to that of the feeding hopper 7. The hopper body 25 has support pins 40a and 40b protruding in juxtaposition from its lateral outer side surface. The stopper 39a is fitted to these support pins 40a and 40b from their lateral sides and thereby keeps its certain operational posture in proximity of the regulating members 35A and 36A. Then, retaining pieces 41 each formed of a bent wire material are inserted through small-diameter through holes formed in protruding parts of the support pins 40a to securely locate the stopper 39a at a predetermined operational position.

Figure 31:
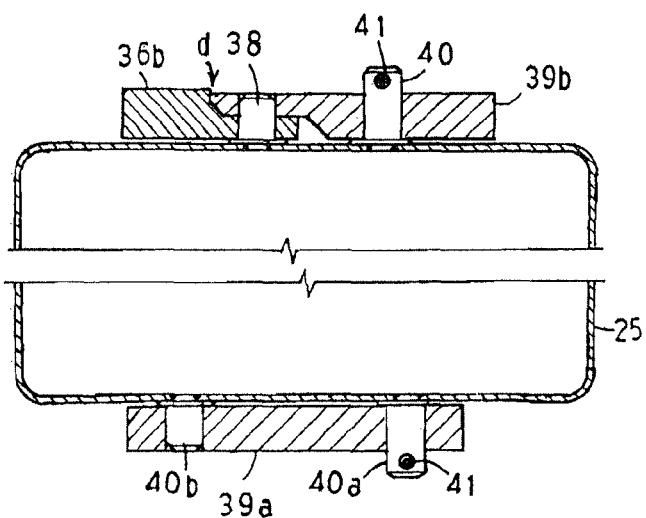
FIG. 31 is a transverse plane view of a stopper-fixing structure.

On the other hand, the stopper 39b on the opposing side parts 26b and 27b is laterally fitted to the high-positioned mounting shaft 38 pivotably supporting the regulating members 36B and a support pin 40 protruding from the lateral outer side surface of the hopper body 2. The stopper 39b is proximate to and facing the regulating member 35B from its upper side. The stopper 39b has a stepped portion d, and the stepped portion d is pushed against the regulating member 36B, as illustrated in FIGS. 28 and 31. This may prevent the regulating member 36B from pivoting around the mounting shaft 38.

As the need arises, the collecting hopper 12 thus structurally characterized may be removed from the drive unit 23 and cleaned. By disassembling the gates 26 and 27 from the hopper body 25, the collecting hopper 12 may be thoroughly cleaned.

The steps of disassembling the gates 26 and 27 from the hopper body are similar to the steps employed for the feeding hopper 7. After the removal of the stoppers 39a and 39b and the regulating members 35A and 35B, 36A and 36B is completed, the gates 26 and 27 are respectively removed from the fulcrum shafts 28 and 29.

The steps of reassembling the gates 26 and 27 to the hopper body are similar to the steps employed for the feeding hopper 7. After the inner gate 26 is fitted to the fulcrum shafts 28 of the hopper body 25, the regulating members 35A and 35B, and then, the coupling links 33a and 33b are respectively fitted to their predetermined positions. Then, the outer gate 27 is fitted to the fulcrum shafts 29 of the hopper body 25 and coupled to the coupling links 33a and 33b, and the regulating member 36A and 36B, and then, the stoppers 39a and 39b are respectively fitted to their predetermined positions.

Other Embodiments

This invention may further include, in its scope, other embodiments hereinafter described.

Figure 32A:
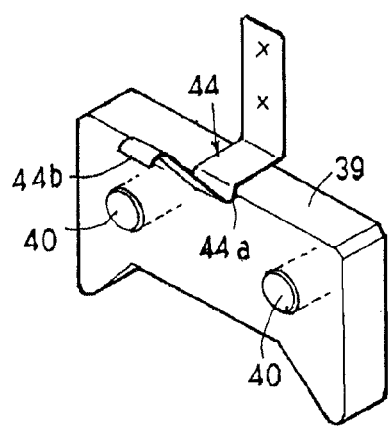
FIG. 32(a) is a perspective view.
Figure 32B:
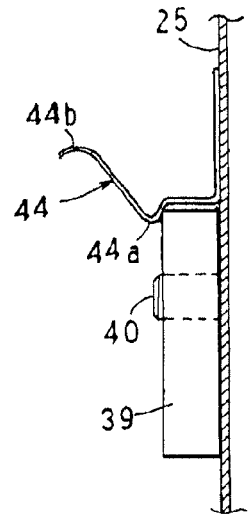
FIG. 32(b) is a side view.

1) The stoppers 39 that prevent fall-off of the regulating members 35 and 36 may be fixed to the hopper body 25 as described below. As illustrated in FIGS. 32, an engaging piece (retaining piece) 44 formed of a band-shaped spring may be securely cantilevered to a lateral side surface of the hopper body 25 to have an upper angular end of the stopper 39 be engaged with a stepped portion 44a of the engaging piece 44.

By fitting the stopper 39 to the support pin 40, the engaging piece 44 is pushed upward by the stopper 39 and thereby elastically deformed. When the stopper 39 arrives at a predetermined position, the engaging piece 44 restores its original shape, allowing the stepped portion 44a to automatically engage with the upper angular end of the stopper 39. When an edge part 44b of the engaging piece 44 is pushed upward with fingers and thereby deformed, the stopper 39 is removable from the support pin 40. This may prevent the loss of such a stopper fixture.

Figure 33A:
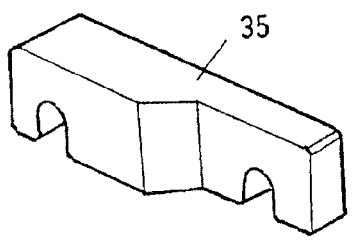
FIG. 33(a) is a perspective view.
Figure 33B:
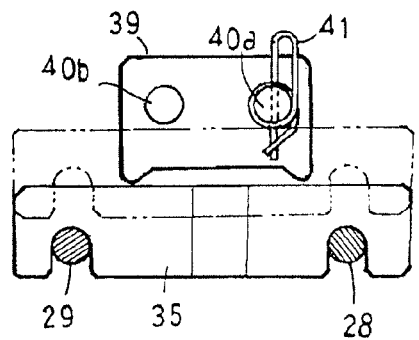
FIG. 33(b) is a front view of the regulating member being fitted to fulcrum shafts.

2) As illustrated in FIGS. 33, one-piece regulating members 35 changed stepwise in thickness may be engaged with the fulcrum shafts 28 and 29 from their upper sides and prevented by the stoppers 39 from falling off these fulcrum shafts.

Figure 34:
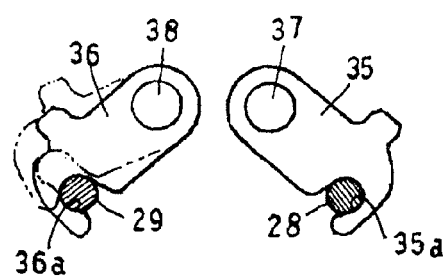
FIG. 34 illustrates yet another embodiment of the regulating member.

3) The regulating members 35 and 36 may be formed of a hard resin material elastically deformable to a certain extent, wherein engaging recesses 35a and 36a engageable with the fulcrum shafts 28 and 29 have inlets slightly smaller than outer diameters of the fulcrum shafts 28 and 29, as illustrated in FIG. 34. These regulating members 35 and 36 are pivoted around the mounting shafts 37 and 38 and then pressed to be engaged with the fulcrum shafts 28 and 29 circumferentially around these fulcrum shafts. The regulating members 35 and 36 may be successfully engaged with the fulcrum shafts 28 and 29 by elastically enlarging the inlets of the engaging recesses 35a and 36a. The regulating members 35 and 36 thus engaged with the fulcrum shafts 28 and 29, unless they are intentionally pivoted upward, may be unlikely to accidentally fall off under rather weak impacts or vibrations during the operation, making the stopper 39 unnecessary.

Figure 35A:
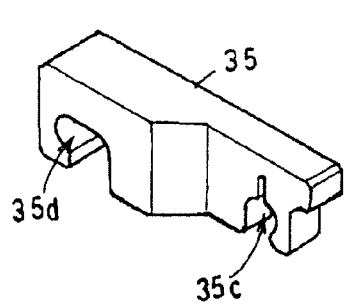
FIG. 35(a) is a perspective view.
Figure 35B:
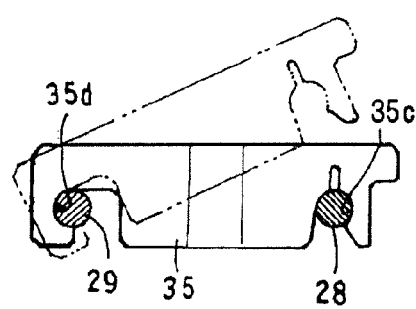
FIG. 35(b) is a front view of the regulating member being fitted to fulcrum shafts.

4) FIGS. 35 illustrate a modified example of the structural option 2). A single regulating member 35 may be provided, which has a pair of engaging recesses 35c and 35d for the fulcrum shafts 28 and 29 to be fitted in. The engaging recess 35c alone has an elastically deformable inlet, and the engaging recess 35d, which is not elastically deformable, is engaged with the fulcrum shaft 29. Then, the regulating member 35 is pivoted around the fulcrum shaft 29 to have the engaging recess 35c be elastically engaged with the fulcrum shaft 28. This structural option may eliminate the need to prepare the mounting shafts 37 and 38, stoppers 3, support pins 40a and 40b, and retaining pieces 41, reducing the number of components. Further advantageously, it becomes unnecessary to weld the mounting shafts 37 and 38 and fulcrum pins 40a and 40b to the hopper body 25, reducing the production costs.

4) The embodiment described earlier illustrates a combination scale including the memory hoppers 9. This invention may also be applicable to combination scales with no memory hopper 9.

The invention claimed is:

1. A hopper, comprising.
a body having openings on upper and lower sides thereof; and
a gate pivotable to open and close the lower opening of the body, wherein
the body of the hopper comprises fulcrum shafts protruding from outer side surfaces on both sides thereof,
the gate comprises opposing side parts spaced apart at an interval greater in dimension than a width of the body between the outer side surfaces, the opposing side parts of the gate being externally fitted pivotably to the fulcrum shafts on the outer side surfaces of the body,
the hopper further comprises regulating members interposed between the outer side surfaces of the body and the opposing side parts of the gate,
the regulating members being configured to regulate movements of the gate in axial directions of the fulcrum shafts to prevent the opposing side parts from falling off the fulcrum shafts, and
the regulating members are detachably engaged with the fulcrum shafts circumferentially around the fulcrum shafts.

2. The hopper as claimed in claim 1, wherein
the opposing side parts of the gate comprise fulcrum portions externally fitted to the fulcrum shafts of the body of the hopper, and
the fulcrum portions comprise fulcrum bosses and flanged bearings removably inserted in the fulcrum bosses from inner sides of the opposing side parts.

3. The hopper as claimed in claim 1, wherein
the body of the hopper comprises mounting shafts protruding from the outer side surfaces of the body,
the regulating members are pivotably and removably fitted to the mounting shafts, and
the regulating members are pivoted around the mounting shafts to be detachably engaged with the fulcrum shafts circumferentially around the fulcrum shafts.

4. The hopper as claimed in claim 1, further comprising stoppers configured to abut the regulating members to deter displacements of the) regulating members engaged with the fulcrum shafts in directions in which the engagements with the fulcrum shafts are released.

5. The hopper as claimed in claim 4, wherein
the body of the hopper comprises support pins protruding from the outer side surfaces of the body,
the stoppers are externally fitted removably to the support pins, and
the hopper further comprises retaining pieces configured to prevent the stoppers from falling off the support pins.

6. The hopper as claimed in claim 4, comprising the gates provided in a pair, wherein
the gates are pivoted, in opposite directions to open and close the lower opening of the body of the hopper,
the regulating members are separately interposed between the outer side surfaces of the body and the opposing side parts of the gates, and
the stopper singly provided deters displacements of the regulating members on the outer side surfaces in the directions in which the engagements with the fulcrum shafts are released.

7. A combination scale, comprising:
a dispersing feeder configured to radially disperse and deliver articles to be weighed received from outside;
a plurality of linear feeders configured to deliver outwardly the articles dispersed in and delivered from the dispersing feeder; and
a plurality of feeding hoppers configured to hold and discharge the articles delivered from the linear feeders; and
a plurality of weighing hoppers configured to hold and weigh the articles discharged from the feeding hoppers, wherein
the feeding hoppers and the weighing hoppers each comprise:
a body having openings on upper and lower sides thereof; and
a gate pivotable to open and close the lower opening of the body;
the bodies of the feeding hoppers and the weighing hoppers each have fulcrum shafts protruding from outer side surfaces on both sides of the body,
the gates each comprise opposing side parts spaced apart at an interval greater in dimension than a width of the body between the outer side surfaces, the opposing side parts in each of the gates being externally. fitted pivotably to the fulcrum shafts on the outer side surfaces of the body,
the feeding hoppers and the weighing hoppers each further comprise regulating members interposed between the outer side surfaces of the body and the opposing side parts of the gate, the regulating members being configured to regulate movement of the gate in axial directions of the fulcrum shafts to prevent the opposing side parts from falling off the fulcrum shafts, and
the regulating members are detachably engaged with the fulcrum shafts circumferentially around the fulcrum shafts.

8. The combination scale as claimed in claim 7, wherein
the opposing side parts in each of the gates comprise fulcrum portions externally fitted to the fulcrum shafts of the body of the hopper, and
the fulcrum portions comprise fulcrum bosses and flanged bearings removably inserted in the fulcrum bosses from inner sides of the opposing side parts.

9. The combination scale as claimed in claim 7, wherein
the bodies of the hoppers each comprise mounting shafts protruding from the outer side surfaces of the body,
the regulating members are pivotably and removably fitted to the mounting shafts, and
the regulating members are pivoted around the mounting shafts to be detachably engaged with the fulcrum shafts circumferentially around the fulcrum shafts.

10. The combination scale as claimed in claim 7, wherein
the feeding hoppers and the weighing hoppers each further comprise stoppers configured to abut the regulating members to deter displacements of the regulating members engaged with the fulcrum shafts in directions in which the engagements with the fulcrum shafts are released.

11. The combination scale as claimed in claim 10, wherein
the bodies of the hoppers each comprise support pins protruding from the outer side surfaces thereof,
the stoppers are externally fitted removably to the support pins, and
the feeding hoppers and the weighing hoppers each further comprise retaining pieces configured to prevent the stoppers from falling off the support pins.

12. The combination scale as claimed in claim 10, wherein
the feeding hoppers and the weighing hoppers each comprise the gates provided in a pair,
the gates are pivoted in opposite directions to each other to open and close the lower opening of the body of the hopper,
the regulating members are separately interposed between the outer side surfaces of the body and the opposing side parts of the gates, and
the stopper singly provided deters displacements of the regulating members on the outer side surfaces in the directions in which the engagements with the fulcrum shafts are released.

13. The combination scale as claimed in claim 7, further comprising a plurality of memory hoppers configured to hold and discharge the articles received from the weighing hoppers, wherein
the memory hoppers each comprise:
a body having openings on upper and lower sides thereof; and
a gate pivotable to open and close the lower opening of the body,
the bodies of the memory hoppers each have fulcrum shafts protruding from outer side surfaces on both sides of the body,
the gates of the memory hoppers each have opposing side parts spaced apart at an interval greater in dimension than a width of the body between the outer side surfaces, the opposing side parts in each of the gates of the memory hoppers being externally fitted pivotably to the fulcrum shafts on the outer side surfaces of the body,
the memory hoppers each further comprise regulating members interposed between the outer side surfaces of the body and the opposing side parts of the gate, the regulating members of the memory hoppers being configured to regulate movement of the, gates in the axial directions of the fulcrum shafts to prevent the opposing side parts from falling off the fulcrum shafts, and
the regulating members of the memory hoppers are detachably engaged with the fulcrum shafts circumferentially around the fulcrum shafts.

* * * * *